US011908281B1

(12) United States Patent
Scott

(10) Patent No.: US 11,908,281 B1
(45) Date of Patent: Feb. 20, 2024

(54) METHOD FOR MULTIDIMENSIONAL PARLAY SPORTS BETTING

(71) Applicant: Winfield Innovations, LLC, Chester Springs, PA (US)

(72) Inventor: John Scott, Chester Springs, PA (US)

(73) Assignee: Winfield Innovations, LLC, Chester Springs, PA (US)

( * ) Notice: Subject to any disclaimer, the term of this patent is extended or adjusted under 35 U.S.C. 154(b) by 0 days.

(21) Appl. No.: 18/090,678

(22) Filed: Dec. 29, 2022

Related U.S. Application Data

(60) Provisional application No. 63/308,015, filed on Feb. 8, 2022.

(51) Int. Cl.

| | |
|---|---|
| ***A63F 9/24*** | (2006.01) |
| ***A63F 11/00*** | (2006.01) |
| ***G06F 13/00*** | (2006.01) |
| ***G06F 17/00*** | (2019.01) |
| ***G07F 17/32*** | (2006.01) |

(52) U.S. Cl.
CPC ...... *G07F 17/3262* (2013.01); *G07F 17/3237* (2013.01); *G07F 17/3244* (2013.01); *G07F 17/3288* (2013.01)

(58) Field of Classification Search
CPC ... G07F 17/32; G07F 17/3211; G07F 17/3214
USPC .............................. 463/1, 20, 22, 25, 30, 39
See application file for complete search history.

(56) References Cited

U.S. PATENT DOCUMENTS

| | | | | |
|---|---|---|---|---|
| 8,814,660 | B2 * | 8/2014 | Thompson | A63F 13/828 463/25 |
| 10,315,102 | B2 | 6/2019 | Green | |
| 2005/0282612 | A1 | 12/2005 | Mathews | |
| 2013/0217475 | A1 * | 8/2013 | Guan | G07F 17/3244 463/25 |
| 2017/0148276 | A1 * | 5/2017 | Russell | G07F 17/3239 |
| 2019/0266848 | A1 * | 8/2019 | Amaitis | G07F 17/32 |

OTHER PUBLICATIONS

Baseball Boxscore bingo .Jul. 28, 1998 (inventor developed).
Football Boxscore bingo . Aug. 23, 1998 (inventor developed).
Fanduel . Dec. 15, 2022.
Bingo cards (Sep. 7, 2019).
Lottery scratch-offs (Jun. 7, 2019).
Slot machines (Dec. 14, 2021).

* cited by examiner

*Primary Examiner* — Adetokunbo O Torimiro
(74) *Attorney, Agent, or Firm* — Joseph E. Maenner; Petock & Petock LLC

(57) ABSTRACT

A method of allocating a single wager into multiple parlay wagers, each including several different wagering events. Wagering events from the multiple parlay wagers are arranged in easily identifiable patterns that are viewed on a single two-dimensional parlay grid. The method includes the selection of wagering events from a list of wagering events or a bettor's betslip, the placement of a wagering event on a parlay grid betspace, re-arrangement of wagering events on the parlay grid, selection of two-dimensional parlay patterns, allocation of a single wager into multiple parlay wagers, displaying potential and actual payout calculations for each of the parlay wagers on a two-dimensional parlay betslip. The method can be performed on any mobile computing device, computer, smart television, or other device properly equipped to perform and display such method.

20 Claims, 24 Drawing Sheets

200

430 – Selection by User from list populates a betspace on the TDP Grid
432 – Betspace contains same identifying information (description, terms, date, time)

| | | | |
|---|---|---|---|
| Bet Amount: | $16.00 | | |
| Total Payout<br>Bet: $16.00<br>Possible: $898.05 | Column 1<br>Bet: $2.00<br>Max Win: $13.80 | Column 2<br>Bet: $2.00<br>Max Win: $11.23 | Column 3<br>Bet: $2.00<br>Max Win: $20.02 |
| Row 1<br>Bet: $2.00<br>Max Win: $13.80 | PHI @ ATL<br>**PHI -3.5 (-110)**<br>9/12/2021 1:00 | BUF @ PIT<br>**Under 47.5 (-110)**<br>9/12/2021 1:00 | JAX @ HOU<br>**HOU +3 (-112)**<br>9/12/2021 1:00 |
| Row 2<br>Bet: $2.00<br>Max Win: $16.98 | SEA @ IND<br>**IND +2.5 (-112)**<br>9/12/2021 1:00 | NYJ @ CAR<br>**NYJ +3.5 (-110)**<br>9/12/2021 1:00 | MIN @ CIN<br>**CIN ML (+135)**<br>9/12/2021 1:00 |
| Row 3<br>Bet: $2.00<br>Max Win: $13.23 | SF @ DET<br>**DET +10 (-110)**<br>9/12/2021 1:00 | MIA @ NEP<br>**NEP ML (-185)**<br>9/12/2021 4:25 | ARI @ TEN<br>**ARI ML (+125)**<br>9/12/2021 1:00 |
| Four Corners<br>Bet: $2.00<br>Max Win: $31.04 | [illegible]iagona[illegible]<br>[illegible]<br>[illegible]x Win: [illegible] | All Spaces<br>Bet: $2.00<br>Max Win: $775.35 | Diagon[illegible]<br>[illegible]<br>[illegible]x Wi[illegible]0 |

470

FIG. 15

484

| Bet Amount: | $25.00 | | |
|---|---|---|---|
| Total Payout<br>Bet: $25.00<br>Possible: $1,733.60 | Column 1<br>Bet: $2.00<br>Max Win: $13.80 | Column 2<br>Bet: $2.00<br>Max Win: $11.23 | Column 3<br>Bet: $2.00<br>Max Win: $20.02 |
| Row 1<br>Bet: $2.00<br>Max Win: $13.80 | PHI @ ATL<br>**PHI -3.5 (-110)**<br>9/12/2021 1:00 | BUF @ PIT<br>**Under 47.5 (-110)**<br>9/12/2021 1:00 | JAX @ HOU<br>**HOU +3 (-112)**<br>9/12/2021 1:00 |
| Row 2<br>Bet: $2.00<br>Max Win: $16.98 | SEA @ IND<br>**IND +2.5 (-112)**<br>9/12/2021 1:00 | NYJ @ CAR<br>**NYJ +3.5 (-110)**<br>9/12/2021 1:00 | MIN @ CIN<br>**CIN ML (+135)**<br>9/12/2021 1:00 |
| Row 3<br>Bet: $2.00<br>Max Win: $13.23 | SF @ DET<br>**DET +10 (-110)**<br>9/12/2021 1:00 | MIA @ NEP<br>**NEP ML (-185)**<br>9/12/2021 4:25 | ARI @ TEN<br>**ARI ML (+125)**<br>9/12/2021 1:00 |
| Four Corners<br>**Bet: $5.00**<br>Max Win: $77.60 | Diagonal<br>Bet: $2.00<br>Max Win: $13.80 | All Spaces<br>**Bet: $4.00**<br>Max Win: $1,550.70 | Diagonal<br>Bet: $2.00<br>Max Win: $16.40 |

480

482

FIG. 16

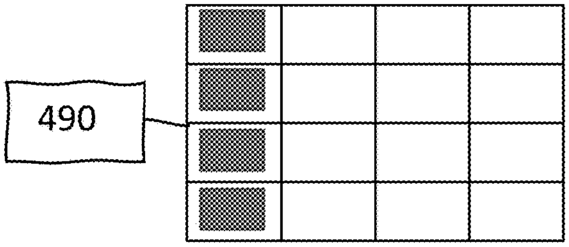
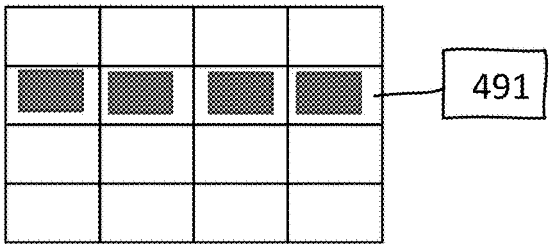
FIG. 17A
FIG. 17B
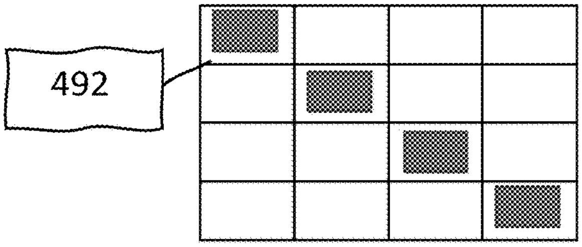
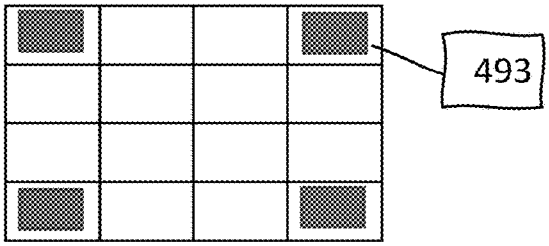
FIG. 17C
FIG. 17D
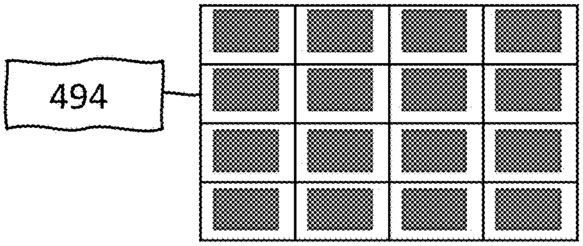
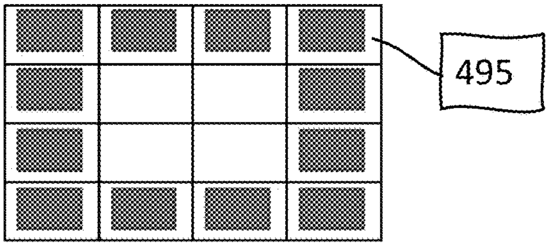
FIG. 17E
FIG. 17F
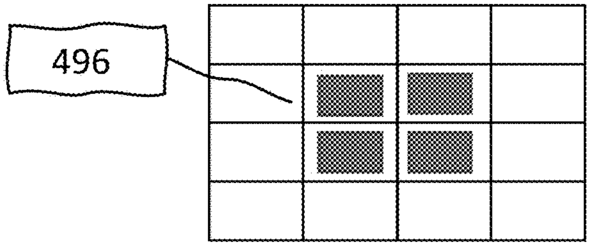
FIG. 17G

534

532

| Four Corners<br>Max Win<br>$22.03 | Column 1<br>Max Win<br>$20.00 | Column 2<br>Max Win<br>$12.01 | Column 3<br>Max Win<br>$9.15 | Column 4<br>Max Win<br>$6.02 | Both Diagonals<br>Max Win<br>$298.55 |
|---|---|---|---|---|---|
| Row 1<br>Max Win<br>$16.81 | DAL<br>+235<br>moneyline<br>vs. TB<br>9/9/2021 | BUF<br>-6<br>spread (-115)<br>vs. PIT<br>9/12/2021 | CAR<br>-210<br>moneyline<br>vs. NYJ<br>9/12/2021 | JAX<br>-2.5<br>spread (-108)<br>vs. HOU<br>9/12/2021 | Diagonal<br>Max Win<br>$11.85 |
| Row 2<br>Max Win<br>$10.86 | TEN<br>-135<br>moneyline<br>vs. ARZ<br>9/12/2021 | LAC<br>-3<br>spread (-110)<br>vs. WAS<br>9/12/2021 | PHL<br>vs. ATL<br>O 48 (-115)<br>total points<br>9/12/2021 | SEA<br>+2.5<br>spread (-110)<br>vs. IND<br>9/12/2021 | Rows 1-2<br>Max Win<br>$210.20 |
| Row 3<br>Max Win<br>$6.02 | MIN<br>-3<br>spread (-108)<br>vs. CIN<br>9/12/2021 | SF<br>vs. DET<br>U 46 (-110)<br>total points<br>9/12/2021 | KC<br>vs. CLE<br>O 48 (-110)<br>total points<br>9/12/2021 | NO<br>PICK | Rows 2-3<br>Max Win<br>$82.26<br>Rows 3-4<br>Max Win<br>$91.11 |
| Row 4<br>Max Win<br>$12.12 | NYG<br>+1<br>spread (-115)<br>vs. DEN<br>9/12/2021 | LAR<br>-7<br>spread (-110)<br>vs. CHI<br>9/12/2021 | BAL<br>-4<br>spread (-108)<br>vs. LV<br>9/13/2021 | NO<br>-3<br>spread (-110)<br>vs. GB<br>9/12/2021 | Diagonal<br>Max Win<br>$22.31 |

| Outer Box<br>Max Win<br>$1,494.55 | Columns 1-2<br>Max Win<br>$272.14 | Columns 2-3<br>Max Win<br>$131.00 | Colums 3-4<br>Max Win<br>$70.23 | All Spaces<br>Max Win<br>$19,453.57 |
|---|---|---|---|---|
| **TOTAL POSSIBLE PAYOFF:** | | | **$22,252.79** | |

530

FIG. 21

METHOD FOR MULTIDIMENSIONAL PARLAY SPORTS BETTING

CROSS-REFERENCE TO RELATED APPLICATION

The present application claims the benefit of U.S. Provisional Patent Application Ser. No. 63/308,015, filed on Feb. 8, 2022, which is incorporated herein by reference in its entirety.

BACKGROUND OF THE INVENTION

Field of the Invention

The present invention relates generally to placing wagers on sporting events and more particularly to a system and method allowing bettors to select, arrange and view multiple parlay wagers, as allocated from a single wager, on a two dimensional grid.

Description of the Related Art

Online sports betting has become a popular activity due to technological advances and legalization at State level. Where legal, licensed sportsbook operators allow individuals to place wagers on the outcomes of sporting events, thus increasing a person's interest in the entertainment and ultimate outcome of the event. These wagers may be placed via mobile computing device, computer, kiosk, face-to-face with a sportsbook representative, and via other devices equipped to support an online sports betting application.

Presently, sportsbooks allow bettors to place a single wager on the outcome of a single event, or a single wager on the outcome of multiple sporting events; known as a parlay wager. Events, for wagering purposes, may consist of any outcomes related to a sporting contest, activity or accomplishment by a player, team, related party, or combination of all.

The parlay wagering format appeals to bettors given an interest in combining multiple events with a potential for higher financial payouts in comparison to placing a single wager on a single event or several wagers on several individual events. Given that a bettor must properly select the outcome of all events in a parlay wager to achieve a significant payout, the entire wager is typically lost as soon as an outcome is deemed unfavorable to the wager. Once the parlay wager is lost, the bettor no longer holds an interest in the remaining events in the parlay wager. Sportsbook operators, sponsors, and bettors desire a wagering method which extends the duration of the bettor's engagement in the wagered events, while still returning a profit to the sportsbook. Additionally, bettors desire a method to view the progress and outcome of several parlay wagers on a single screen or page, rather than scrolling through several page views of individual betslips.

It would be beneficial to be able to make and arrange multiple parlay bets in a single grid to enhance a bettor's experience.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The invention fulfills the aforementioned deficiencies by providing sports betting application methods to allow bettors to remain engaged in a group of parlay wagers despite the loss of one or more wagering events, combined with the capability to view multiple parlay wagers on a single screen or page.

The application relies upon the present functionality of a basic sportsbook system. These sportsbook functions include providing and managing bettor accounts, determining a bettor's geographic location, providing a selection of wagering events with updated odds, accepting parlay wagers, handling wagering event conflicts in parlay wagers, producing betslips, updating the live status of events on a real-time basis, and settling wagers.

The invention is a computer application designed to provide bettors with the ability to select multiple, non-conflicting wagering events, place the selected events on a two-dimensional parlay grid with grid dimension determined by bettor, and strategically arrange the selected events on the grid to create different parlays. The grid displays multiple parlays to the bettor, based on easily recognizable patterns.

A single wager, as entered by the bettor, is allocated equally to each of the individual parlays represented on the grid. Utilizing the sportsbook operator's offering of wagering events, the system allows the bettor to locate desired events from a list or categorized menu. Upon the selection of an event by a bettor, the system will populate a betspace on the grid.

The system will continue to take selections from the bettor until the grid is full or the bettor has completed the selection process. As betspaces are filled, the system will calculate and recalculate the maximum potential payouts for each of the individual parlay wagers represented on the grid. In addition to adding selected wagering events, the system provides the bettor with the abilities to remove a selection and swap selections between two betspaces.

Once the bettor is satisfied with the selection and arrangement of wagering events on the grid, the bettor's wager, and the potential payouts from each individual parlay, the bettor will be prompted to place a bet on the two-dimensional parlay grid as entered and presented to the bettor. Once the bettor places the bet, the sportsbook will verify and approve or reject the bet. A rejection may require the bettor to accept revised terms, delete their wager, or modify a selection or amount.

Upon approval by the sportsbook, the two-dimensional parlay grid will become an active betslip, providing a similar display of all wagering events, potential payouts for each parlay wager, along with the live status of each wagering event on the grid. Additionally, the sportsbook will generate active betslips for each of the individual parlay wagers, assigned to the bettor's account, in the same form as it processes traditional wagers.

As wagering events in the bettor's two-dimensional parlay are completed, the status of those events and the parlay wagers represented by those events will be updated and displayed on the grid until all events are completed. Ultimately, the sportsbook will settle each betslip for each individual parlay wager that exists within the two-dimensional parlay wager.

This two-dimensional wagering invention allows the activities related to placing and viewing many individual parlay wagers to be viewed on a single interactive page or screen. Prior to the invention, the same number of parlay wagers (10 to 20) would require approximately 10 to 20 times longer in duration for a bettor to enter, along with approximately 8 to 20 viewing screens or pages, versus a single screen, for the bettor to view on their mobile computing device or computer.

BRIEF DESCRIPTION OF THE DRAWINGS

The accompanying drawings, which are incorporated herein and constitute part of this specification, illustrate the presently preferred embodiments of the invention, and, together with the general description given above and the detailed description given below, serve to explain the features of the invention. In the drawings:

FIG. 15 is an illustration that may be used with the method to "process a bettor's removals 130 or modifications" as shown in the flowchart of FIG. 4.

FIG. 16 is an illustration that may be used with the method to "process a bettor's removals 130 or modifications" as shown in the flowchart of FIG. 4

FIG. 17A is an illustration of an exemplary method of a parlay wager that exists within the two-dimensional parlay" as shown in the flowchart of FIG. 4.

FIG. 17B is an illustration of another exemplary method of a parlay wager that exists within the two-dimensional parlay" as shown in the flowchart of FIG. 4.

FIG. 17C is an illustration of still another exemplary method of a parlay wager that exists within the two-dimensional parlay" as shown in the flowchart of FIG. 4.

FIG. 17D is an illustration of yet another exemplary method of a parlay wager that exists within the two-dimensional parlay" as shown in the flowchart of FIG. 4.

FIG. 17E is an illustration of a further exemplary method of a parlay wager that exists within the two-dimensional parlay" as shown in the flowchart of FIG. 4.

FIG. 17F is an illustration of a still further exemplary method of a parlay wager that exists within the two-dimensional parlay" as shown in the flowchart of FIG. 4.

FIG. 17G is an illustration of yet another further exemplary method of a parlay wager that exists within the two-dimensional parlay" as shown in the flowchart of FIG. 4.

FIG. 21 is an illustration depicting alternate 4×4 dimensions of a two-dimensional parlay grid that, along with other dimensions, may exist on a graphical interface.

DETAILED DESCRIPTION

Figure 1:
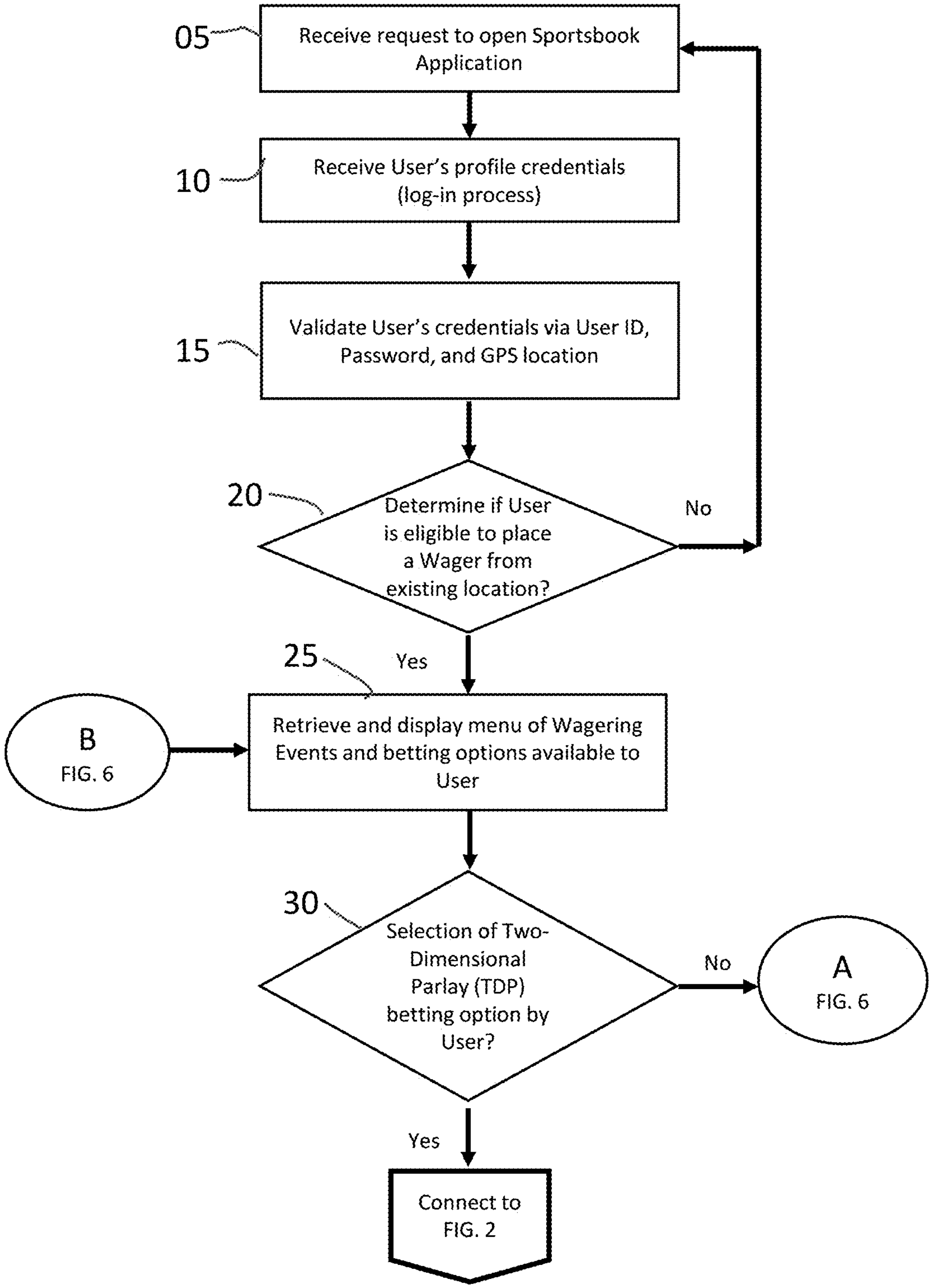
FIG. 1 is a flowchart of an existing method used to access a sportsbook for the purpose of placing a wager via mobile computing device, computer, smart television, or other device properly equipped to perform and display such method.

In the drawings, like numerals indicate like elements throughout. Certain terminology is used herein for convenience only and is not to be taken as a limitation on the present invention. The terminology includes the words specifically mentioned, derivatives thereof and words of similar import. The embodiments illustrated below are not intended to be exhaustive or to limit the invention to the precise form disclosed. These embodiments are chosen and described to best explain the principle of the invention and its application and practical use and to enable others skilled in the art to best utilize the invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

The word "about" is used herein to include a value of +/−10 percent of the numerical value modified by the word "about" and the word "generally" is used herein to mean "without regard to particulars or exceptions."

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Unless explicitly stated otherwise, each numerical value and range should be interpreted as being approximate as if the word "about" or "approximately" preceded the value of the value or range.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

The present invention is directed to a sports betting application and associated computer implemented methods for online sports betting and wagering.

With reference to the drawings and in operation, the invention fulfills deficiencies related to the ineffective display of multiple parlay wagers on multiple screens or pages, through the use of a two-dimensional betslip. By providing a method to build and arrange a two-dimensional parlay wager, the invention also overcomes the loss of bettor engagement that occurs upon the loss of a single wagering event.

In an exemplary embodiment, the present invention can be utilized by a sportsbook operator that possesses a system capable of offering, accepting, and processing parlay wagers on sporting events, by an individual. As used herein, the terms, "sportsbook operator", "sportsbook", and "operator" are used interchangeably, referring to a company responsible for the management of a system designed to accept, process, and settle wagers on the outcomes of various sporting events and competitions. Sportsbook system functions include providing and managing bettor accounts, determining a bettor's geographic location, providing a selection of wagering events with betting terms, accepting single or basic (one-dimensional) parlay wagers, handling wagering event conflicts when creating parlay wagers, producing betslips, updating the live status of events on a real-time basis, and settling wagers. The invention described herein does not provide those functions, rather it relies on the use of a sportsbook's system to supply such functionality to the application. The terms "wager" and "bet", herein used interchangeably, refer to a sum of money placed against another party's money, on the basis of the outcome of an event. The term "wagering event" refers to a specified outcome related to a sporting contest, activity, accomplishment, or lack of accomplishment by a player, team, related party, or combination of all. "Betting terms" refer to an identification of the specific terms and conditions that must be met for a wager to win or payout. Betting terms may include, but are not limited to, details of the specified event, odds, spread, over/under total points, moneyline, wager amount, props, and maximum possible win. The term "betslip" refers to a printed or electronic form that records how much money a bettor has wagered on the outcome of an event or series of events, the bettor's potential payout, as well as the betting terms for those wagers. The betslip is documented evidence of the wagers that a bettor places with a sportsbook. The term "parlay wager" refers to a wager that is dependent on the combined outcomes of two or more wagering events. Typically, a parlay wager only pays out if the bettor wins or ties all wagering events represented in the parlay wager.

Systems and methods of the invention are configured for a sportsbook to offer, accept, display, update, and settle a two-dimensional parlay wager. The term "two-dimensional parlay" as initially defined herein, and not previously defined elsewhere, refers to the allocation of a single wager to multiple parlay wagers, each comprised of several wagering events. These many individual parlay wagers are arranged in easily identifiable patterns which are viewed on a single two-dimensional grid or two-dimensional betslip. The terms "two-dimensional parlay grid" and "grid", herein used interchangeably, refer to a two-dimensional array of rectangles or similarly sized shapes, known as betspaces, with a minimum of two horizontal rows and two vertical columns. The term "betspace", as initially defined herein, and not previously defined elsewhere, relates to the positioning and identification of one wagering event, as selected by the bettor and placed on the grid. The grid provides a visual display of several parlay wagers arranged by the bettor. Each of the bettor's several parlay wagers can be identified through a common pattern such as a sequence of betspaces in a row, column, diagonal line, box, corners, etc.

A selected embodiment of the invention will now be explained in conjunction with references to drawings. It will be apparent to those skilled in the art from this disclosure that the following description of the embodiment of the invention is provided for illustration only and not for the purpose of limiting the invention.

In general, the invention is configured as an add-on application for an existing sportsbook system. An "add-on" application refers to an application that can be easily attached to a larger project, system, or website; also referred to as a "bolt-on". The invention, as an add-on application, includes a non-transitory machine-readable storage medium, having encoded thereon program code, wherein, when the program code is executed by a machine, the machine implements a method for placing a plurality of parlay wagers. The method begins operation once the sportsbook receives a request to open the two-dimensional parlay betting option. This request cannot be performed until the sportsbook has completed a series of steps as represented in FIG. 1. These steps include receipt of a request to open the sportsbook application in step 05, receipt of the bettor's profile credentials through a log-in process in step 10, the validation of the bettor's credentials in step 15, and the determination of the bettor's eligibility to place a wager from the bettor's location in step 20.

Figure 6:
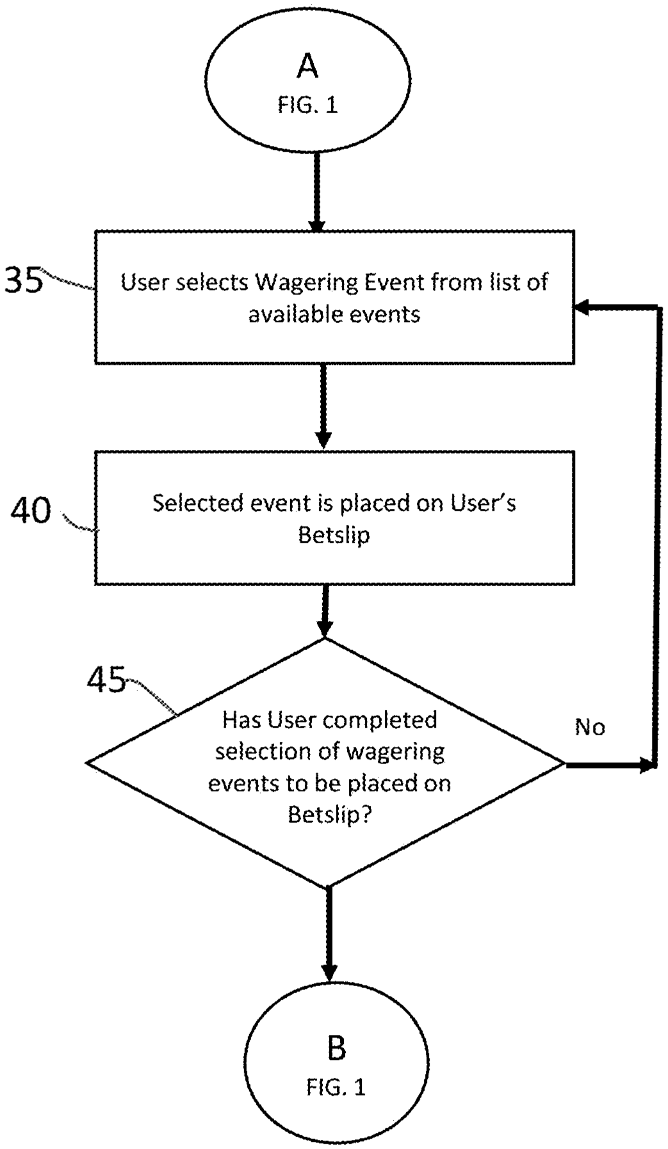
FIG. 6 is a flowchart of an existing operation of a sportsbook that allows a bettor to place wagering events onto a betslip prior to combining the wagering events to form a parlay wager.
Figure 7:
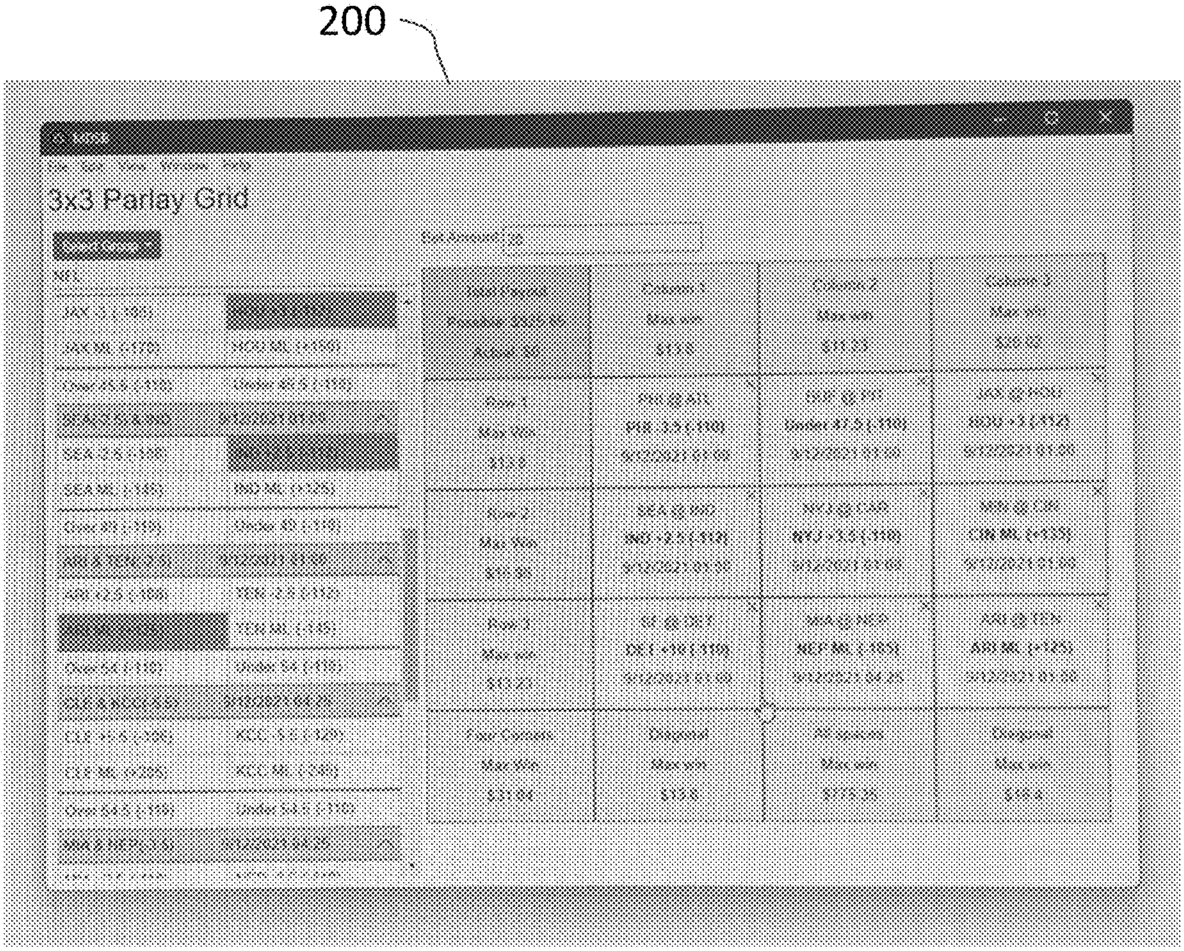
FIG. 7 is an exemplary graphical bettor interface used for illustrations in the form of screenshots as used in FIGS. 8-14.

Satisfaction of those steps will release an interactive display of wagering events and betting options to the bettor in step 25. Referring to FIG. 6, bettor may utilize the existing sportsbook application to select wagering events in step 35, place the events on a betslip in step 40, and return to the main menu prior to placing a wager in step 45. Selection of the two-dimensional parlay betting option by the bettor will deploy the system and methods for the invention as described and represented in the following sections in step 30. The interactive display may be programmed in the form of a text-based interface or a graphical bettor interface. A "graphical bettor interface" refers to a form of bettor interface that allows bettors to interact with electronic devices through graphical icons or an audio indicator such as primary notation, instead of text-based bettor interfaces, typed command labels or text navigation. The selected embodiment and drawings assume the use of a graphical bettor interface 200 as shown in FIG. 7.

Figure 2:
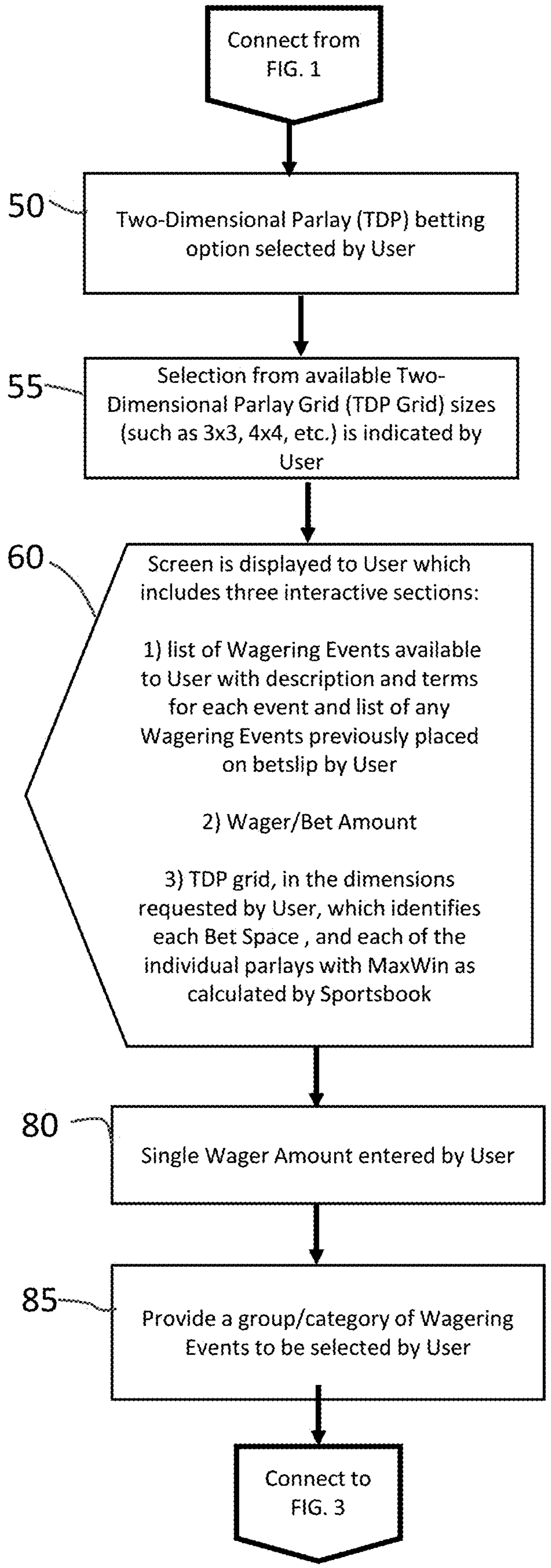
FIG. 2 is a flowchart of the method to deploy an interactive screen in the form of a graphical bettor interface, which will provide a bettor with the selections and decisions necessary to place a two-dimensional parlay wager.
Figure 8:
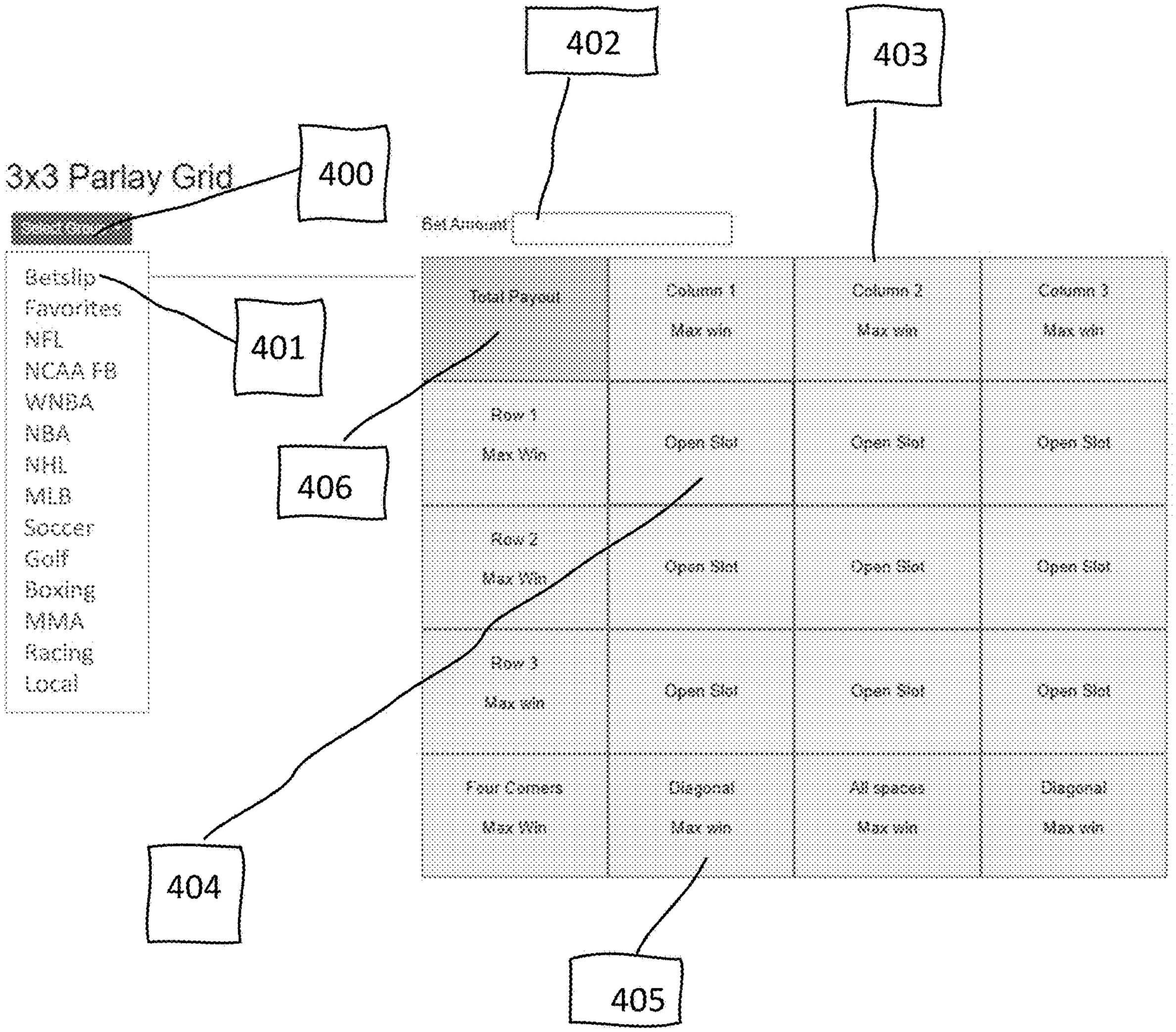
FIG. 8 is an illustration of an exemplary graphical interface that may be used with the method to "display an interactive screen" as shown in the flowchart of FIG. 2.
Figure 9:
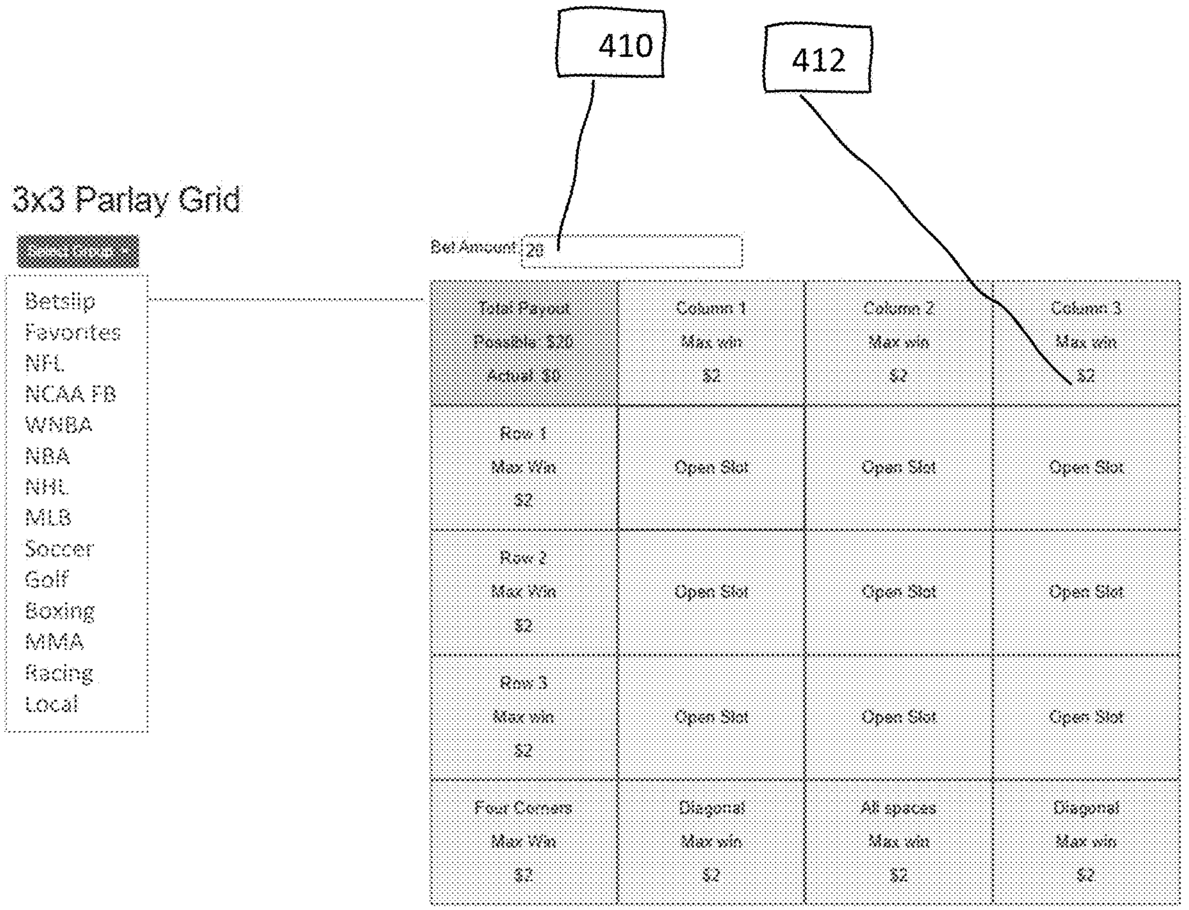
FIG. 9 is an illustration of same graphical interface that may be used with the method to "place a single two-dimensional wager" as shown in the flowchart of FIG. 2.
Figure 10:
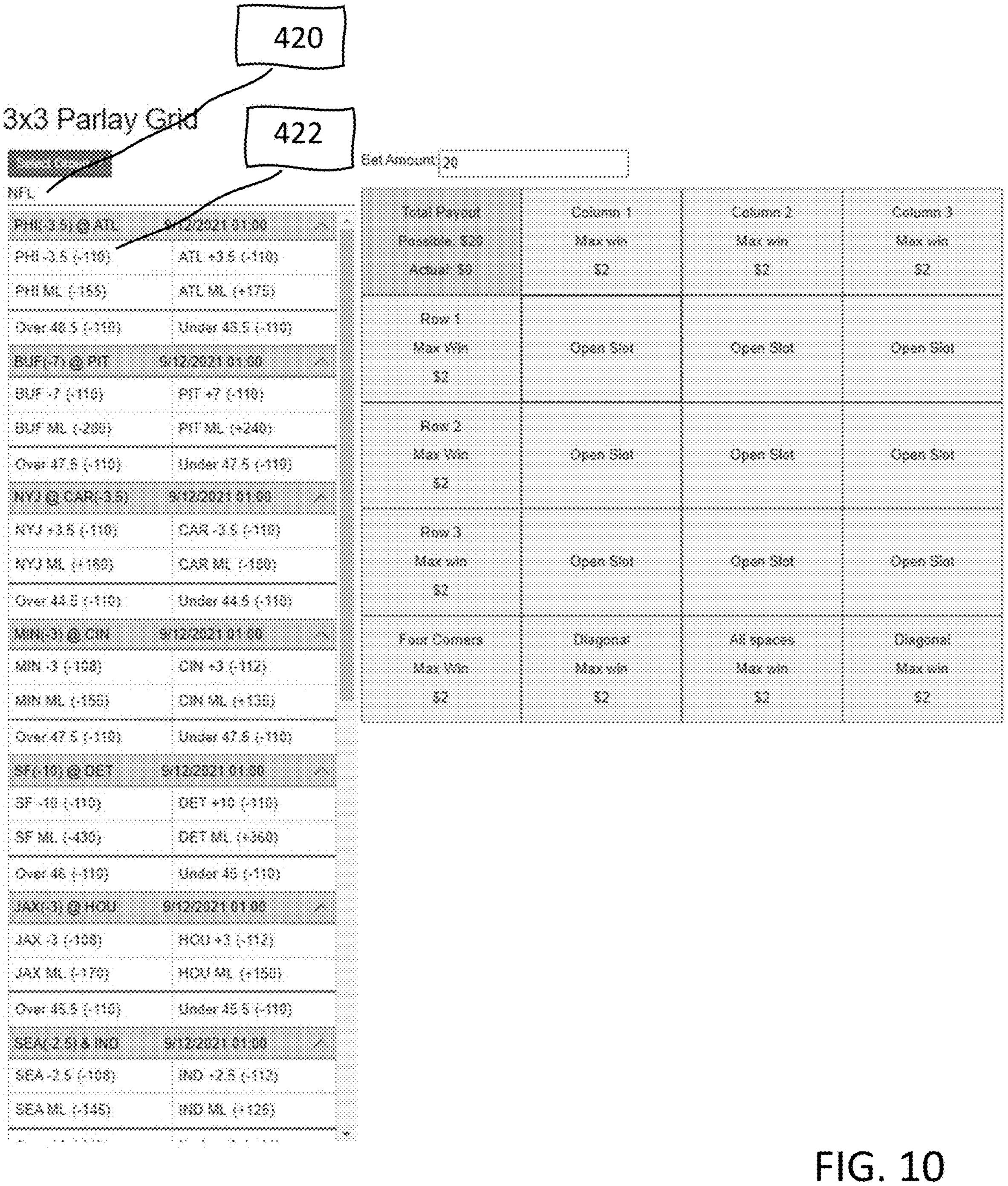
FIG. 10 is an illustration of same graphical interface that may be used with the method to "provide a bettor with a category of wagering events" as shown in the flowchart of FIG. 2.
Figure 22:
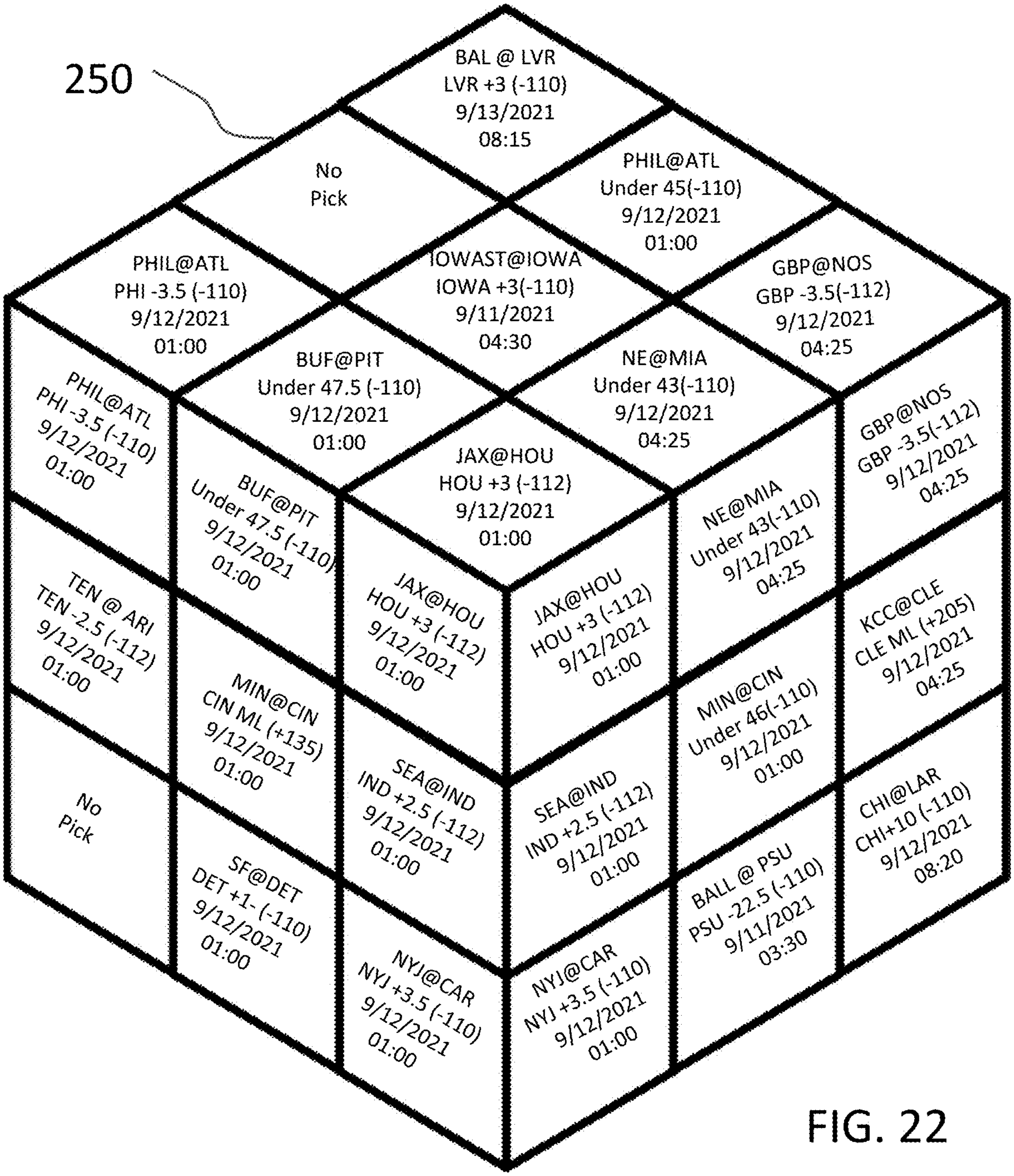
FIG. 22 is an illustration depicting an alternate design and dimensions of a three-dimensional cubed grid that may exist on a graphical interface, using similar methods as those described herein.

FIG. 2 is a schematic representation of the interactive components of the system, with further reference to FIGS. 8-10. In the exemplary embodiment, the invention, in the form of a non-transitory machine-readable storage medium, will be prompted to display the two-dimensional parlay betting options available to the bettor, along with instructions or information as deemed necessary for bettor input in step 50. Betting options refer to the various grid dimensions available to the bettor, for the purpose of creating and arranging a two-dimensional parlay wager. In the selected embodiment, drawings refer to a three row by three column grid or "3×3". Grid dimensions may be of any size and dimension of at least two rows and two columns, or "2×2". An alternate 4×4 grid is shown in FIG. 21. An alternate "3×3×3" three-dimensional cube 250 is illustrated in FIG. 22. Each face of cube 250 can be considered a separate 3×3 two-dimensional grid, with a "No Pick" in the central block that cannot be seen from ay angle.

Upon receipt of the bettor's grid dimension selection in step 55, the application will furnish an interactive display to the bettor in step 60. While activities in the selected embodiment refer to the use of a single screen, elements of the application may be displayed on separate screens as deemed necessary to maximize sportsbook processing and display preferences of the bettor.

Figure 23:
FIG. 23 is an illustration of an alternate, condensed 4×4 two-dimensional parlay grid for smaller screens.

The interactive two-dimensional parlay display consists of three distinct components, illustrated on FIG. 8. A list of wagering events, as categorized by type of sport, league, date, or other criteria is furnished to the bettor 400. Additionally, a category exists for the bettor to access wagering events previously placed, but not wagered, which may exist on the bettor's betslip 401. Data related to wagering events resides in the existing system of the sportsbook operator. The application "pulls" this information, from the sportsbook, into the interactive display for reference, selection, and processing purposes. The screen displays a required entry of a betting amount 402 by the bettor2, representing their single bet or wager amount on the two-dimensional parlay. The bettor's betting amount will be further allocated to the several parlay wagers that exist within the grid. The bettor will have access to an empty 3×3 grid with bordering rectangles which provide information related to the individual parlay wagers 403. Unfilled betspaces, which total a quantity of nine for a 3×3 grid, are each displayed as an open slot 404. Betspaces are bordered by informational spaces 405. These informational spaces are used to display the parlay location, Max Win, wager amount, or other status of each of the several individual parlays that exist on the grid. The total combined possible payout for all of the individual parlay wagers is calculated and displayed 406. "Max Win" refers to the maximum possible payout which a bettor can win for a particular wager. Each individual parlay is referenced in the border space, by description of the location of the series of wagering events that comprise the individual parlay wager. As illustrated on a 4×4 grid in FIGS. 17A-17G, each individual parlay is represented as an easily identifiable one- or two-dimensional pattern, such as a vertical series/column 490, horizontal series/row 491, a diagonal series 492, a box 495, all corners 493, all spaces 494, or any other recognizable pattern 496. References to these individual parlays and patterns may be described in form as "Row 1", "Column 3", "All Spaces", "Bottom Right Diagonal", etc. or through the use of related abbreviations such as "R1", "C1", "ALL", "BRD", etc. While the selected embodiments in these drawings are provided for illustration purposes, it may not meet the space constraints of a handheld device. Accordingly, FIG. 23 refers to an alternate, condensed layout 210 that provides similar functionality on a small handheld device.

The interactive display is capable of receiving various instructions from the bettor. These instructions may occur in the same or different order as reflected in the drawings, initiating various processes and calculations to be performed by the application. The application will receive the two-dimensional parlay wager or bet amount, in financial terms entered by bettor in step 80 in FIG. 2. The single wager is then allocated, proportionally to each of the individual parlays that exist within the two-dimensional parlay grid. FIG. 9 provides an example of an entry 410 of $20 by bettor, with an allocation of $2 to each of the ten individual parlays 412, as processed. The application will permit the bettor to revise the single wager amount and may include an option to modify the allocation of the wager to each individual parlay; further flowcharted in FIG. 4.

The two-dimensional parlay grid is built and arranged from the selections of wagering events and instructions received from the bettor. Upon selection of a wagering event category by the bettor, the application displays information and betting terms related to individual wagering events available from the sportsbook in step 85. In FIG. 10 the sportsbook offers information and betting terms related to an NFL contest between Philadelphia (PHI) and Atlanta (ATL) on Sep. 12, 2021 at 1:00 pm 420. From that contest, the sportsbook offers a wagering event described as PHI-3.5

(−110) 422, along with five other wagering events related to the same contest. To those familiar with the aspects of sports betting, selecting this particular wagering event translates to a bettor betting that Philadelphia's total final score, minus 3.5 points, will exceed Atlanta's total final score for the contest. Should the wager be a successful win for the bettor, the sportsbook would pay at a ratio of $100 for every $110 wagered by the bettor. Conversely, the full amount of the bettor's wager would be retained by the sportsbook if the wager was unsuccessful to the bettor. The sportsbook returns the wager to the bettor should a tie occur; this is also known as a "push".

Figure 3:
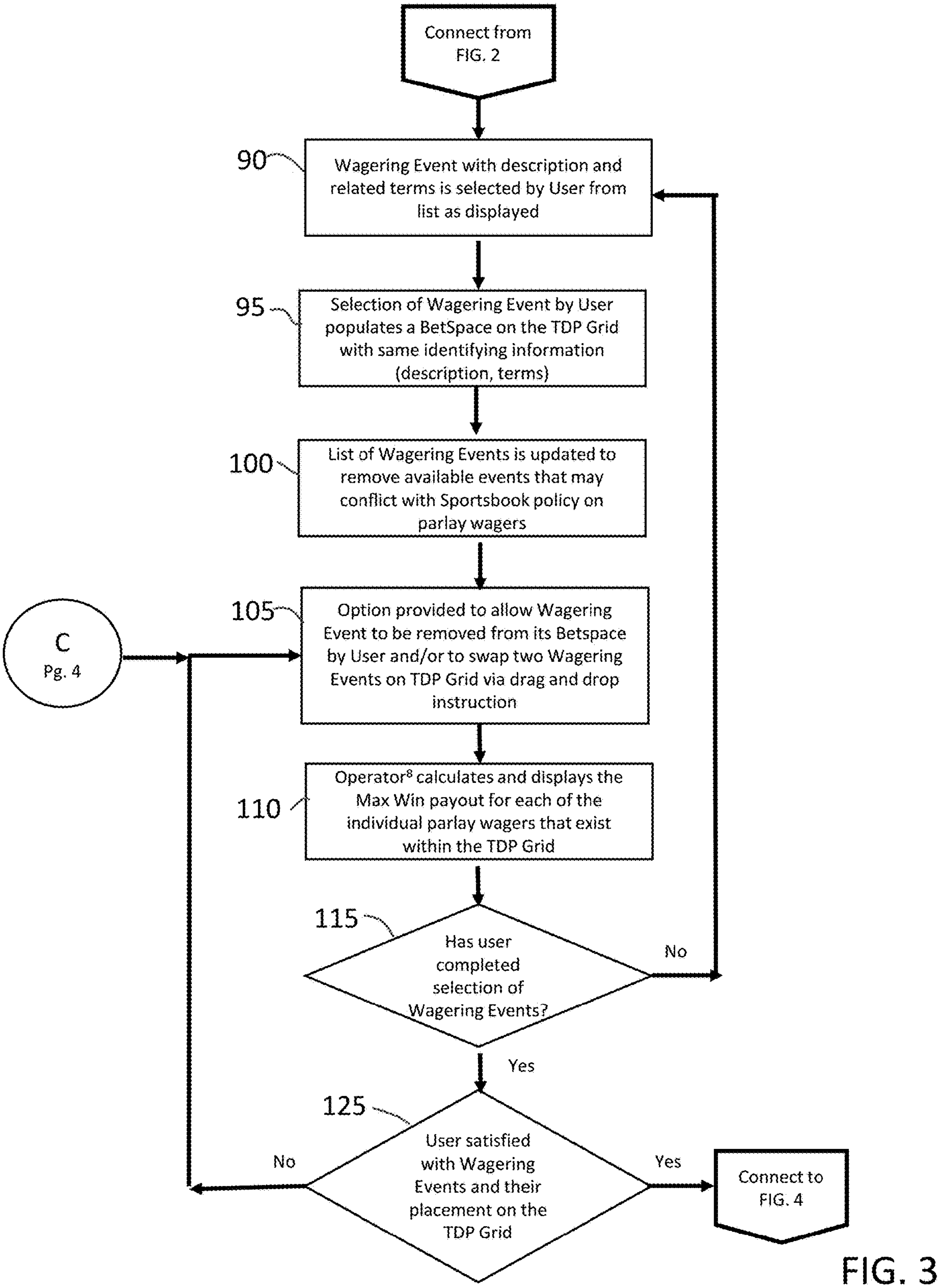
FIG. 3 is a flowchart depicting the method of receiving a bettor's selections, arrangements, and changes of wagering events for the purpose of calculating and displaying potential winning payouts and creating a two-dimensional parlay wager.
Figure 11:
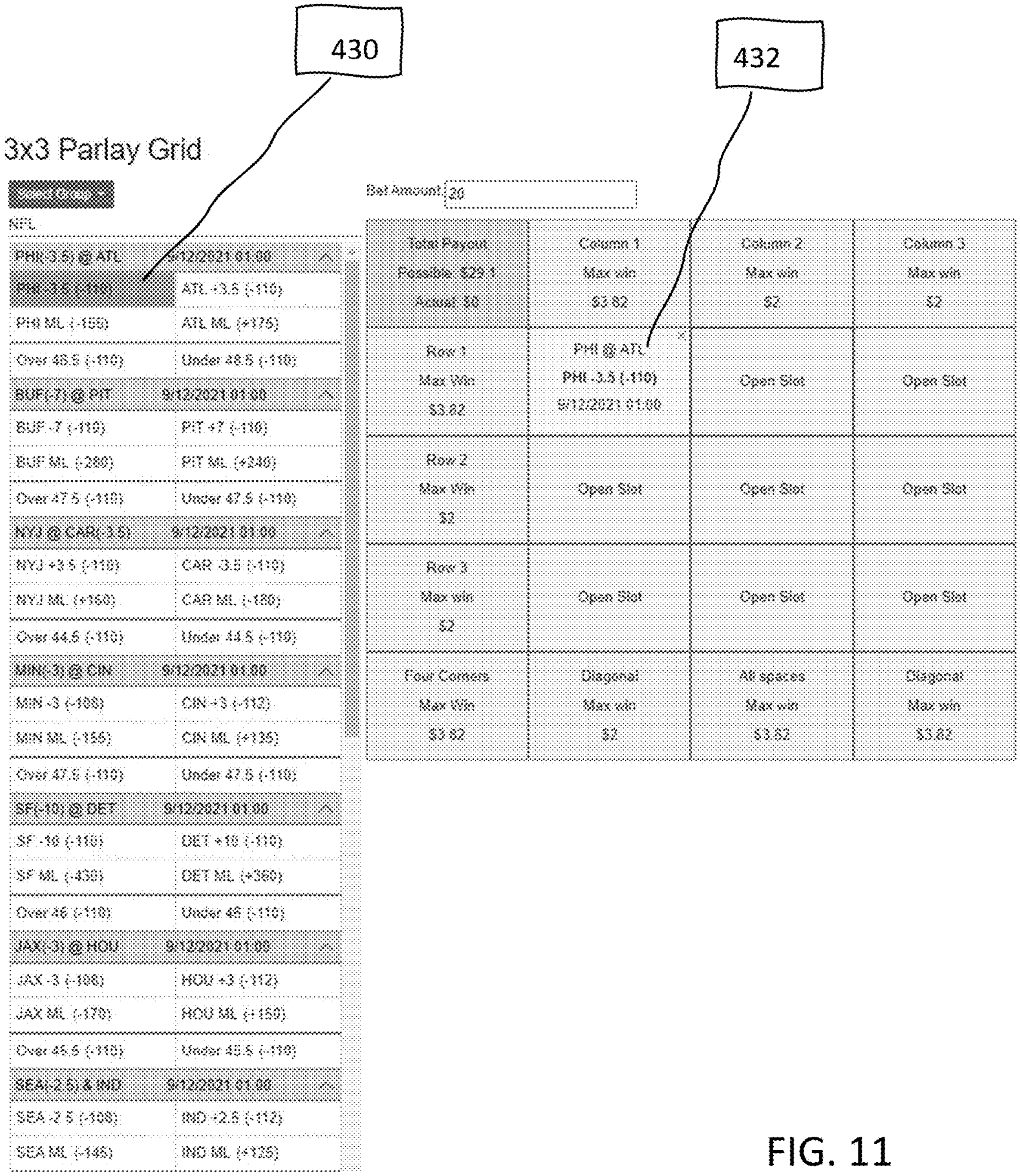
FIG. 11 is an illustration of same graphical interface that may be used with the method to "receive bettor's selections and arrangements" as shown in the flowchart of FIG. 3.

FIG. 3 is a schematic of the processes involved in building and arranging the two-dimensional parlay grid. Upon selection of a wagering event by bettor in step 90, the application will populate a designated betspace on the grid in step 95. Bettor may select the betspace to be filled with the selected wagering event, otherwise the application will default to the first available open slot. Bettor's selection and instructions may be performed on FIG. 11 through any input method available to the interface (screen tap, drag and drop, click, keyboard stroke, etc.) 430. The betspace will now contain information and betting terms similar to those provided in the list 432. Given the fluid nature of sports betting, betting terms on the betspace will be updated for changes, as they occur, and will require bettor confirmation prior to the final wager being placed and accepted by the sportsbook. Likewise, the list of available wagering events may be updated to remove or indicate the existence of specific wagering events that may conflict with the sportsbook's policy on parlay wagers in step 100. For example, a sportsbook may not permit a bettor to form a parlay with more than one wagering event from the same contest or a wagering event related to a contest that has already begun.

Upon the addition, removal, or movement of a wagering event on the grid in step 105, the application will calculate (or recalculate) the Max Win payout for each of the individual parlay wagers, and the total possible payout of all wagers that exist on the grid in step 110.

Step 115 determines whether the bettor has completed his/her selection of wagering events. If not, the process reverts to step 90; if so, the process proceeds to step 125 where the bettor is asked whether he/she is satisfied with their wagering events and placement on the grid. If not, the process reverts to step 105; if so, the process proceeds to step 130.

Figure 12:
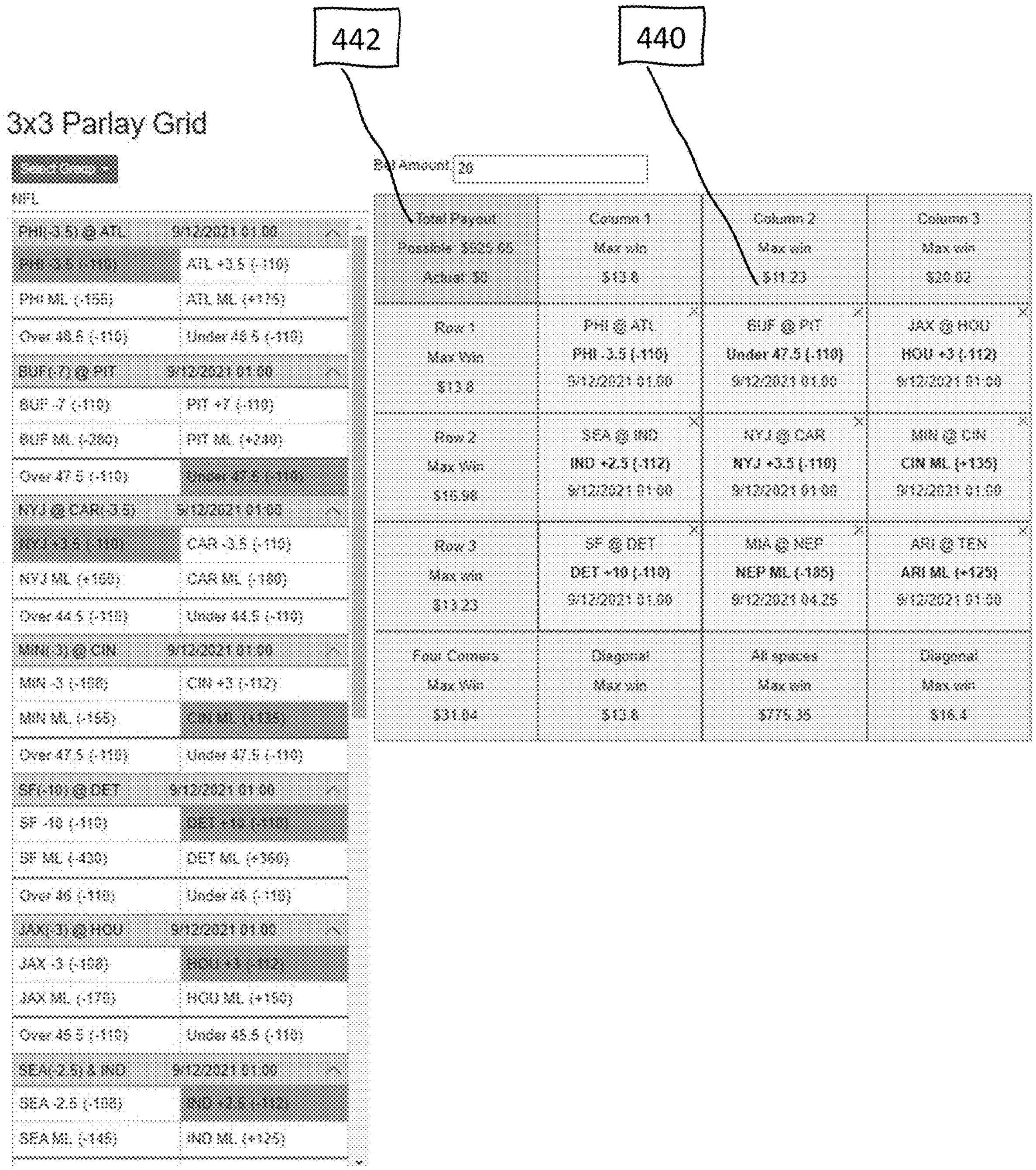
FIG. 12 is an illustration of same graphical interface that may be used with the method to "calculate and display potential winning payouts" as shown in the flowchart of FIG. 3.
Figure 13:
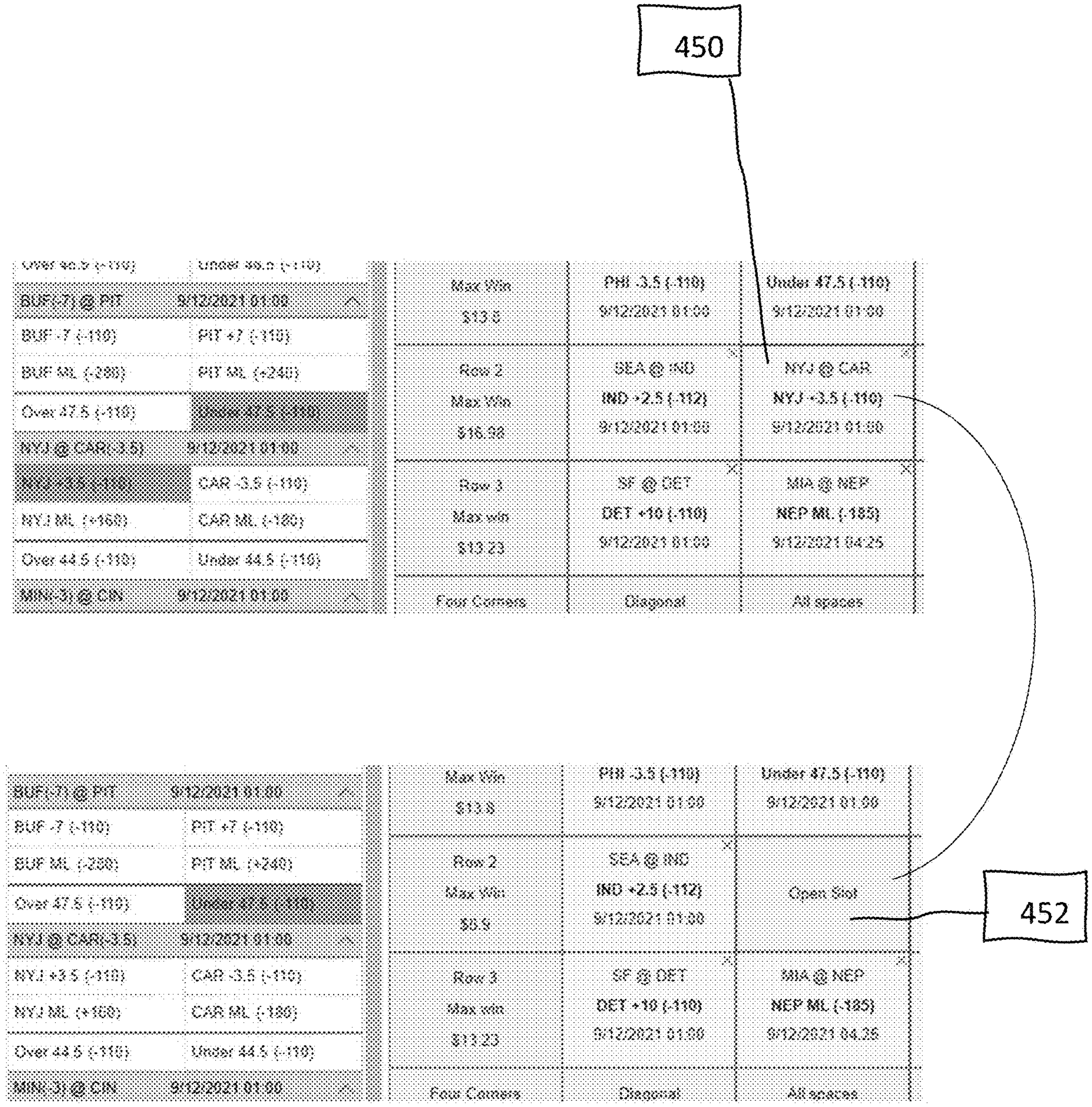
FIG. 13 is an illustration of same graphical interface that may be used with the method to "receive bettor's changes of wagering events" as shown in the flowchart of FIG. 3.
Figure 14:
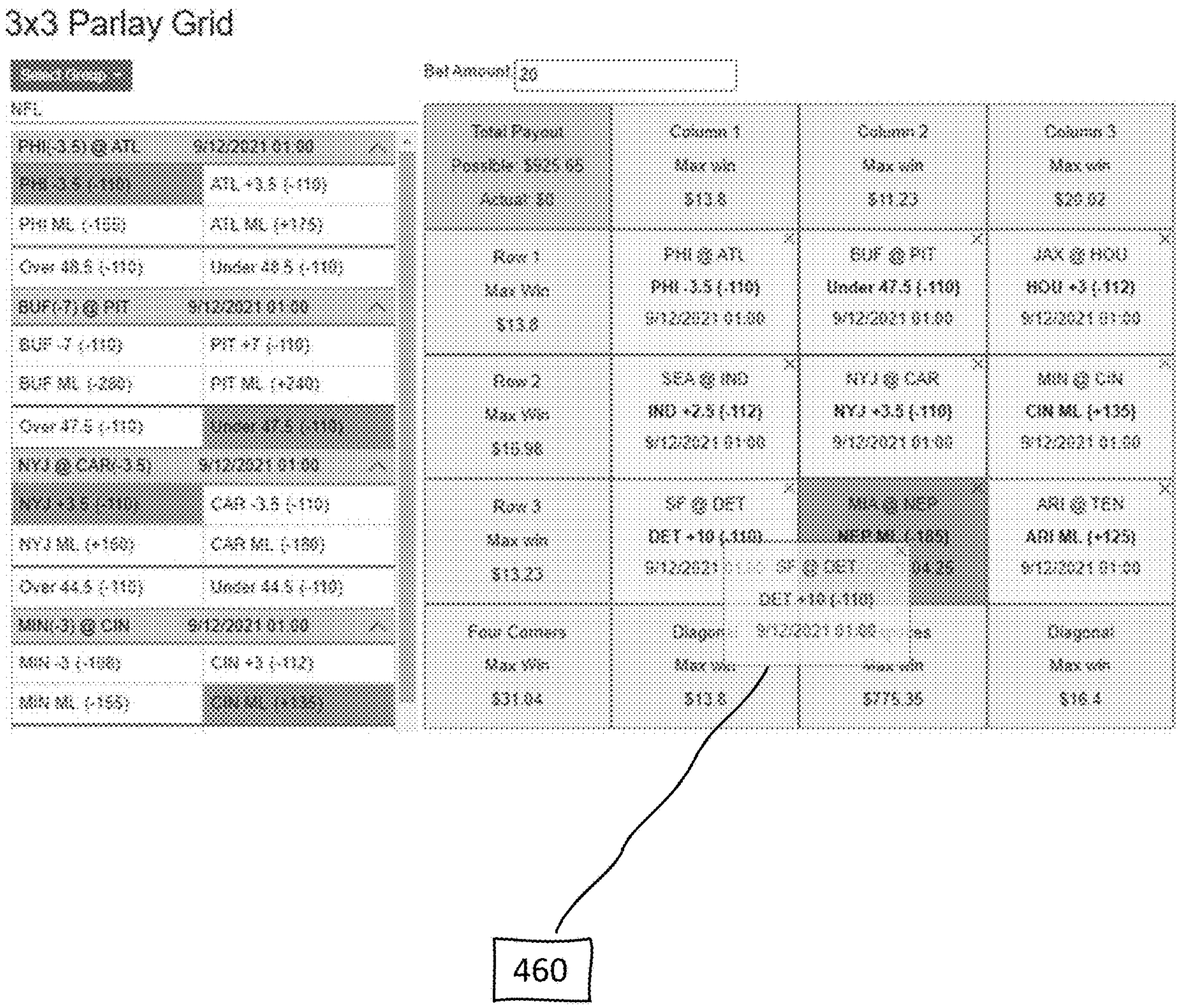
FIG. 14 is an illustration of same graphical interface that may be used with the method to "receive bettor's changes of wagering events" as shown in the flowchart of FIG. 3.

FIG. 12 displays a 3×3 grid with wagering events populating all nine betspaces. The Max Win is calculated for individual parlays 440 and in total 442. Once a wagering event has been placed on the grid, the application will permit the bettor to remove the wagering event from its betspace 450, thereby re-opening the betspace and returning it to the list of available wagering events 452 as illustrated in FIG. 13. The application will also permit the bettor to move a wagering event from one betspace to another using a drag and drop instruction as illustrated in FIG. 14. If the other betspace is occupied by a previously selected wagering event, the bettor will instruct the application will perform a swap of the two events in their respective betspace positions 460.

Figure 4:
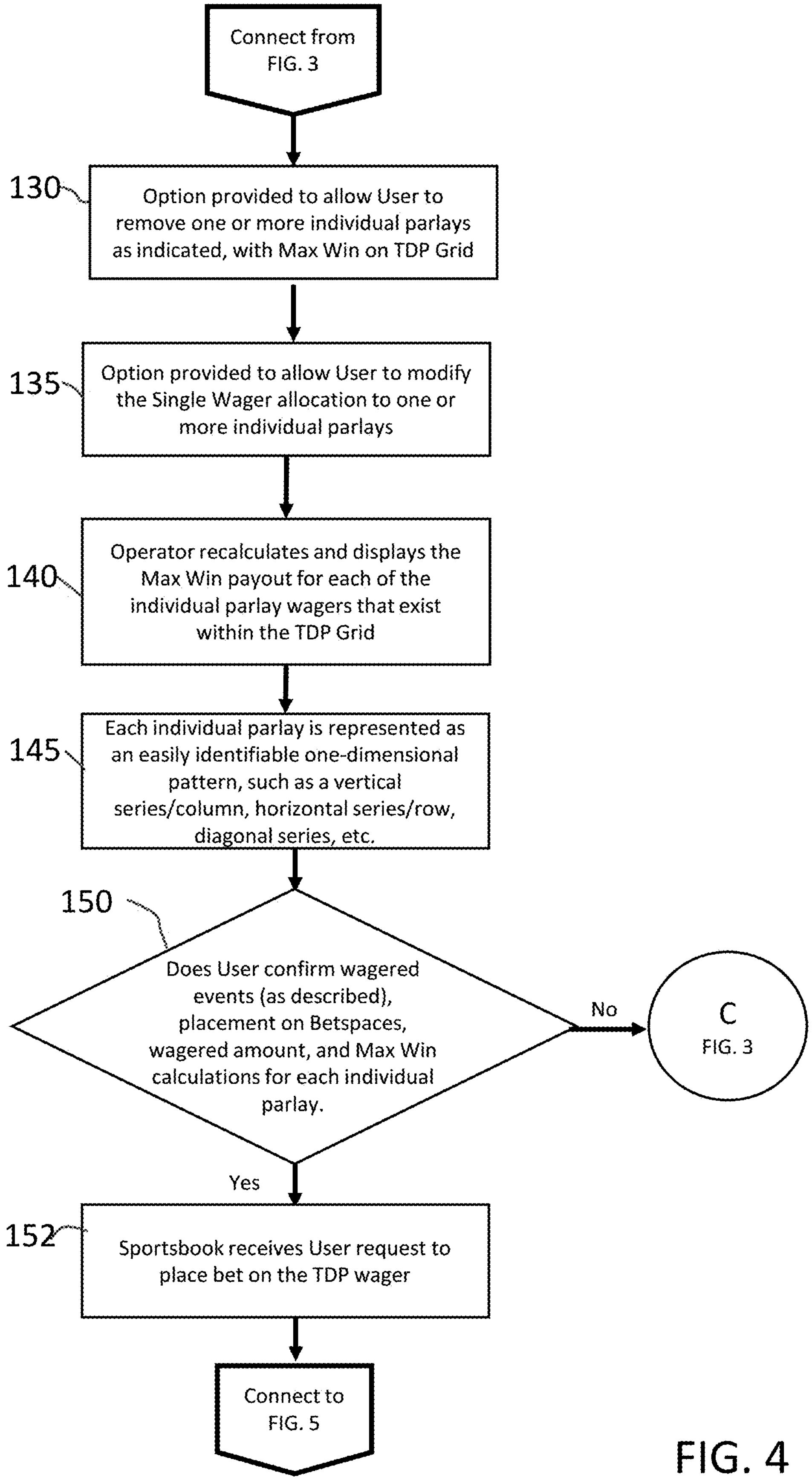
FIG. 4 is a flowchart of the method of processing a bettor's modifications to a two-dimensional parlay wager, identifying the individual parlay wagers that exist within the two-dimensional parlay, and receiving a bettor's request to place a wager.

FIG. 4 is a schematic of processes related to optional capabilities and bettor selections which may permit modifications to default settings. Options to remove in step 130 and modifications in step 135 are not limited to those provided herein. FIG. 15 provides an example of a removal of two of the ten individual parlays that exist within the 3×3 grid 470. The removal option may take the form of a bettor's choice to delete the individual parlay or change the individual wager amount, for that parlay, to $0-. The receipt of a bettor's instruction to modify an individual parlay wager will open an edit option of the application. With the edit option open in FIG. 16, a bettor may modify the previously allocated wager amount for any individual parlay wager 480. The removal or modification of an individual parlay will result in a recalculation of the Max Win payouts as displayed 482, and the total bet amount 484.

Upon the removal or modification of an individual parlay, the application will once again recalculate the Max Win payout for each of the individual parlay wagers, and the total possible payout of all wagers that exist on the grid in step 140. Each individual parlay is represented as an easily identifiable one-dimensional pattern in step 145 as detailed in FIG. 17. The application will continue to take instructions from the bettor until the bettor is satisfied with the selection and placement of each wagering event, their associated betting terms, the wager amount, and the Max Win calculations as displayed in step 150. Betspaces may be left empty, at the bettor's discretion as illustrated in FIG. 21. An empty betspace 530 simply reduces the number of wagering events comprising an individual parlay. Upon receipt of the bettor's instruction to place the bet in step 152, the sportsbook will conduct a review of all betting terms associated with wagering events in the two-dimensional parlay and any potential conflicts within or between those events.

Figure 5:
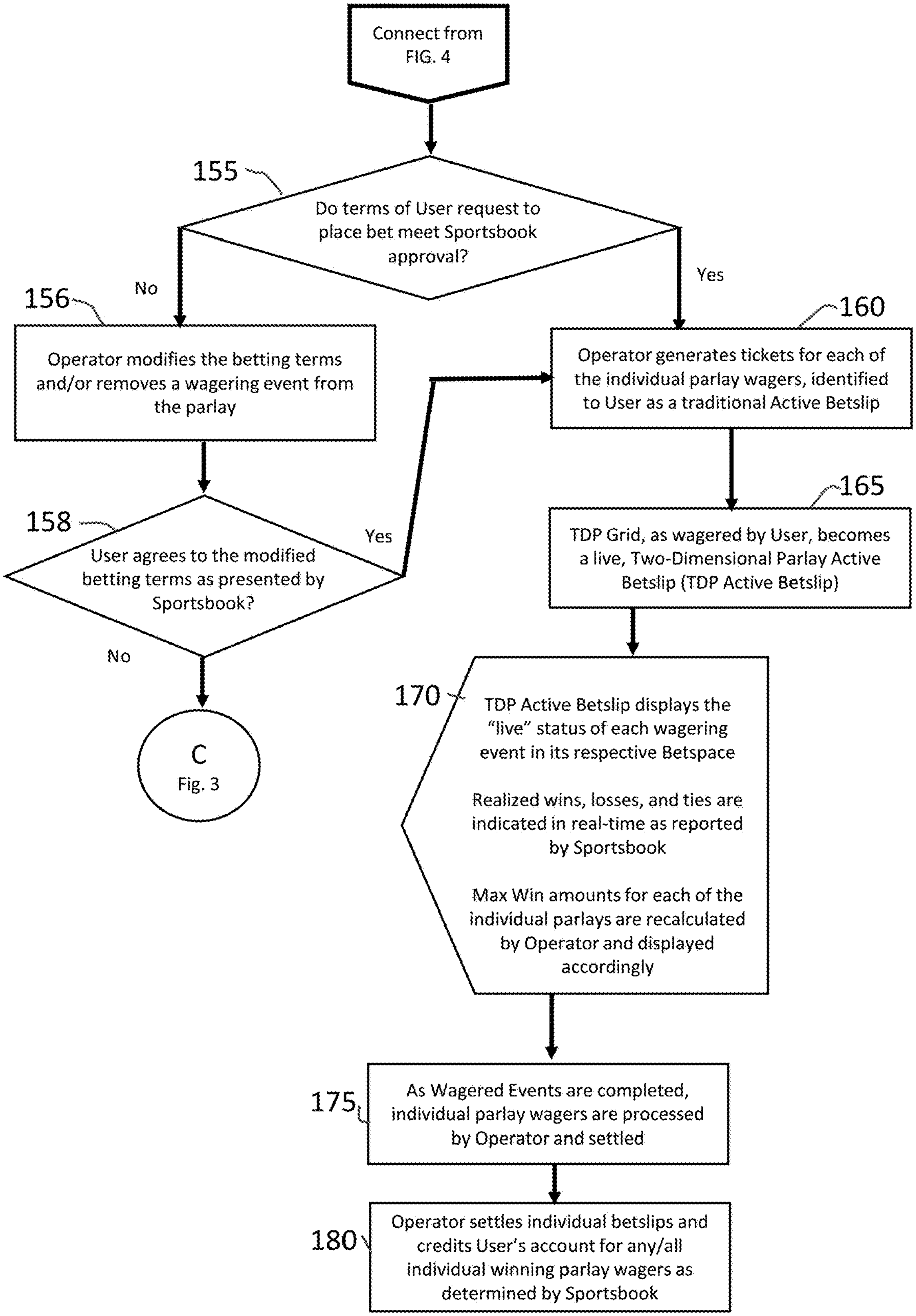
FIG. 5 is a flowchart of the method of generating and settling a bettor's active betslip.

FIG. 5 is a schematic of the processes related to generating, displaying, managing, and settling a confirmed and active two-dimensional parlay wager. Once the bettor places the bet, the sportsbook will verify and may approve or reject the bet in step 155. A rejection by the sportsbook may require the bettor to accept revised terms, delete their wager, or modify a selection or amount in step 156. Bettor may agree to the modified betting terms in step 158, re-open the two-dimensional parlay and make modifications, or delete the request to place a bet.

Figure 24:
FIG. 24 is an illustration of individual active and settled parlay betslip similar to those that currently exist in a sportsbook operation.

Once both parties agree to the same betting terms, the sportsbook system will generate tickets, in the form of active betslips for each of the individual parlay wagers in step 160. An "active betslip" refers to a listing of all the bettor's wagers, with their corresponding wagering events and betting terms, where the Max Win is greater than $0 for the wager and the outcome of any wagering event in the individual parlay has not been determined 560 in FIG. 24. Additionally, for enhanced viewing purposes, the application will convert the aforementioned interactive display grid into a two-dimensional parlay active betslip (TDPABS) in step 165.

Figure 18:
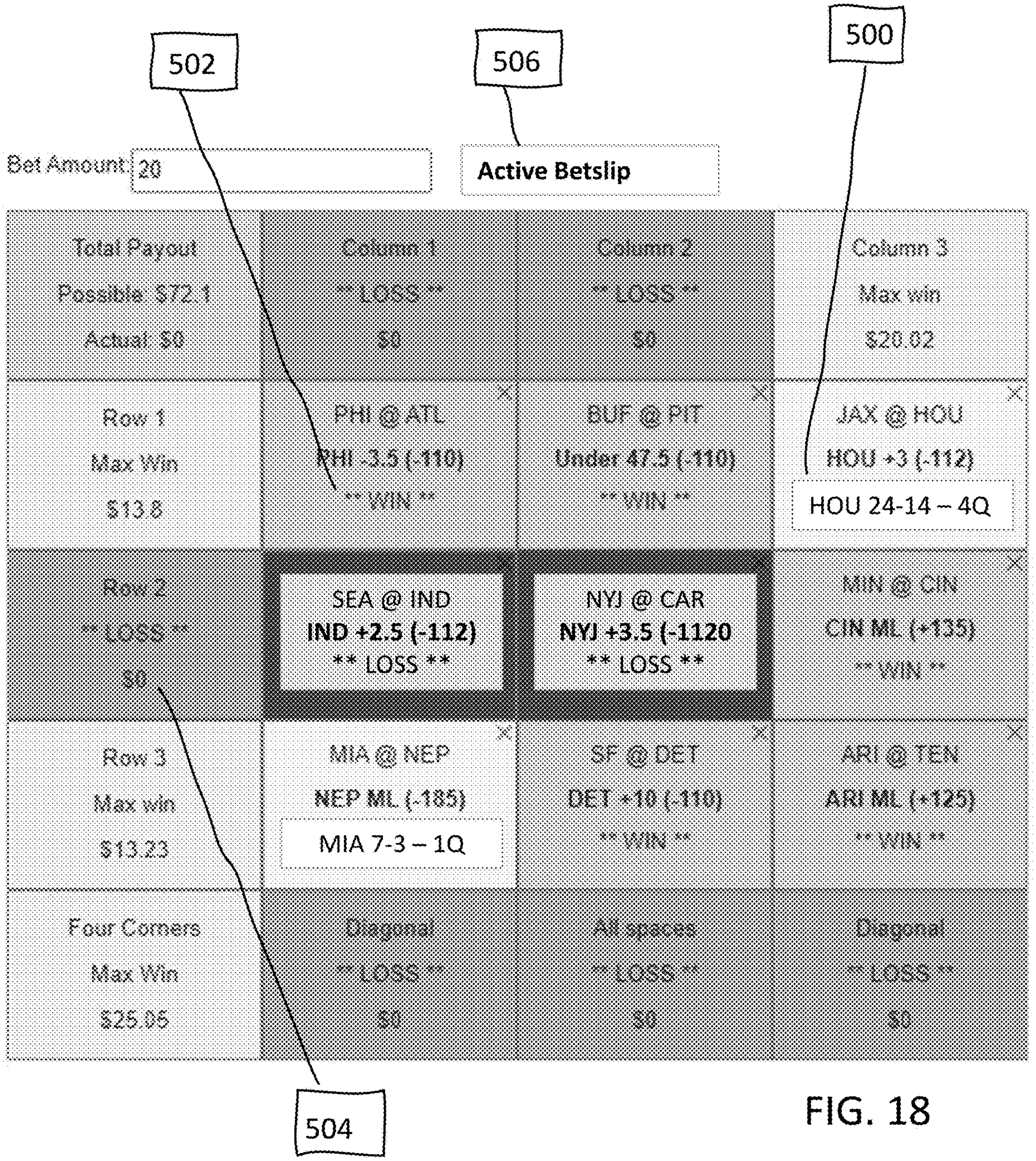
FIG. 18 is an illustration that may be used with the method to "generate a bettor's active betslip" as shown in the flowchart of FIG. 5.
Figure 19:
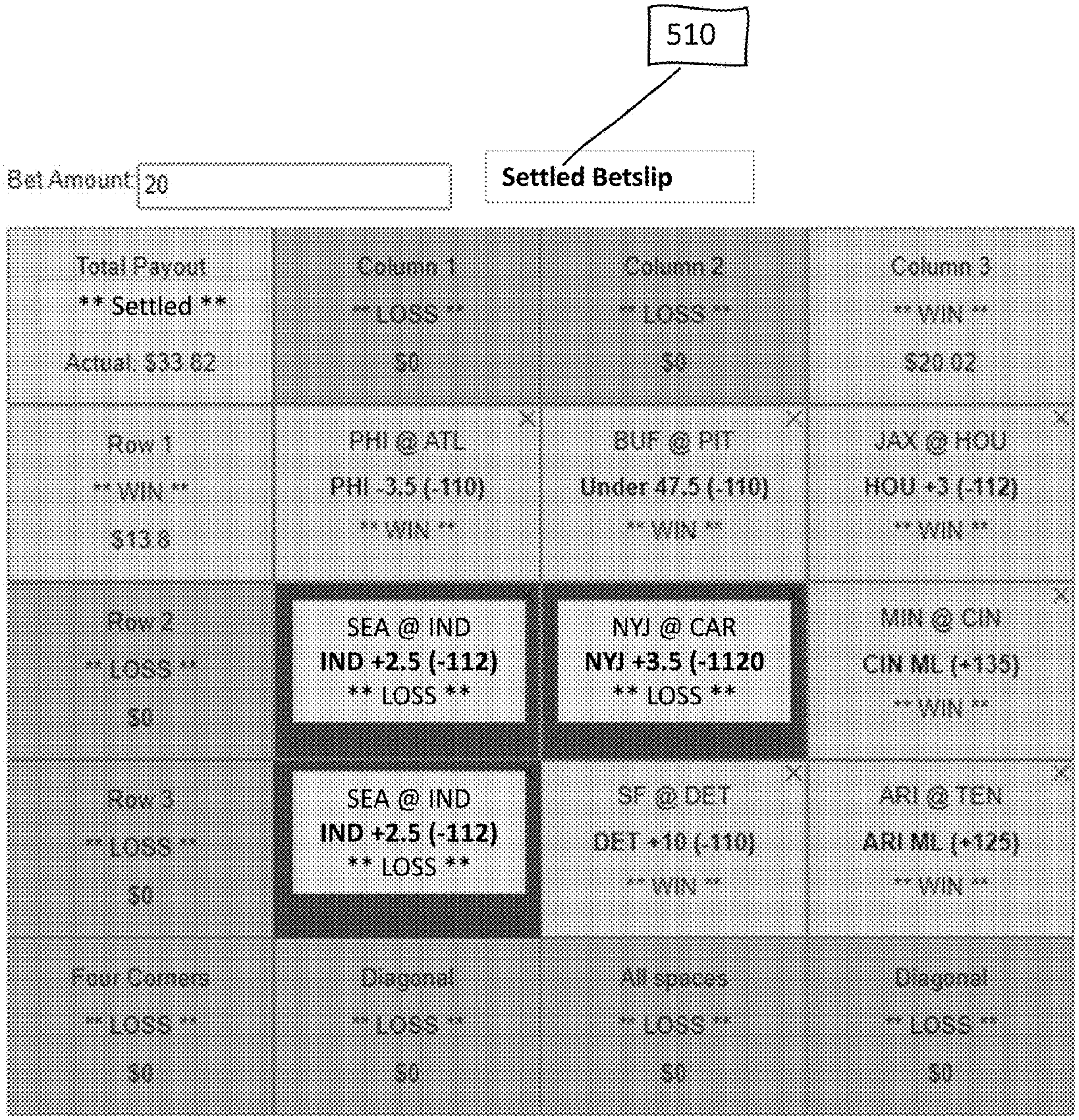
FIG. 19 is an illustration that may be used with the method to "settling a bettor's active betslip" as shown in the flowchart of FIG. 5.
Figure 24A:
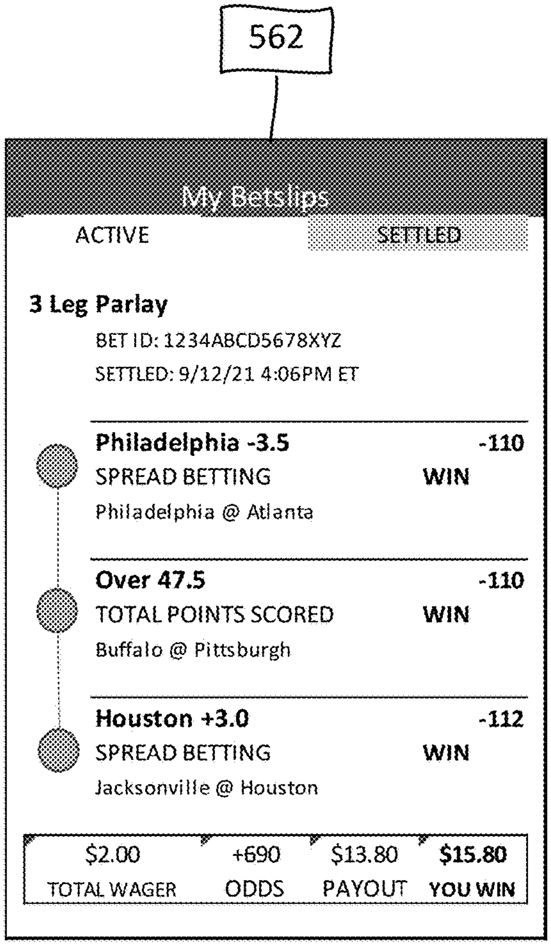
FIG. 24A is an illustration of an alternative individual active and settled parlay betslip similar to those that currently exist in a sportsbook operation.

The TDPABS is similar in appearance to the two-dimensional parlay grid in step 170, without providing the bettor will the ability to modify information on the grid FIG. 18. The TDPABS displays a summary of the "live" status of each wagering event in its respective betspace 500. Upon selection of a wagering event or betspace on the TDPABS by bettor, the application may display an internal pop-up screen or connection to another application containing additional, enhanced information related to the contest and the wagering event; this may include links to external sources for stories, statistics, video/audio feed, highlights, etc. Upon the realization of the outcome of a wagering event (such as the completion of a contest), a win, loss, or tie will be determined and indicated for each of the bettor's selections on the grid 502. As the outcome of individual wagering events are realized, Max Win amounts for each of the individual parlays are recalculated and displayed accordingly 504. The sportsbook will settle each individual parlay in step 175, upon determination of a single wagering event loss, or the determination of all wagering events in the individual parlay by issuing a settled betslip 562 in FIG. 24A. For a winning wager by the bettor, the sportsbook will credit the bettor's account for the calculated winnings, plus the amount of the bettor's wager. The sportsbook will retain the amount of the bettor's wager for a losing wager, and the sportsbook will return the wager amount to the bettor in the event of a tie in step 180. Additionally, for enhanced viewing purposes, upon completion of all wagering events on the TDPABS, the TDPABS will convert from an active status 506 to a settled status. The TDPABS in a final and settled form 510, will be available to the bettor for future reference FIG. 19.

Figure 20:
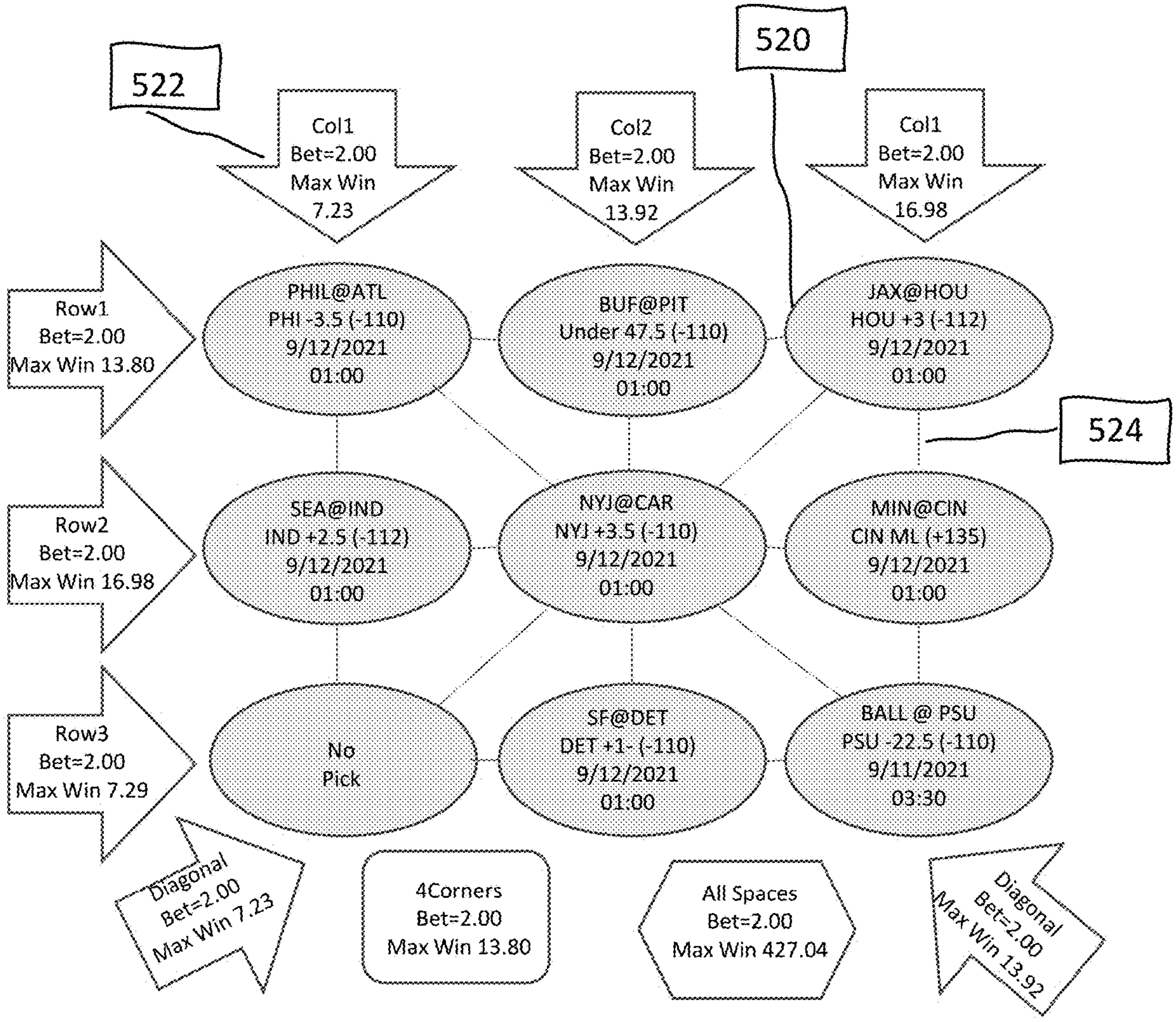
FIG. 20 is an illustration depicting an alternate design of a graphic interface to perform and display the methods previously described.

The method for multi-dimensional parlay sports betting shall not be limited to design elements provided in previous illustrations. FIG. 20 illustrates one of many possible designs for a two-dimensional parlay grid using various shapes 520 and borders 522. The grid, betspaces, and borders need only reflect an arrangement of elements to denote the linear patterns 524 representing each individual parlay wager. FIG. 21 represents an illustration of a grid with four rows and four columns, a dimension of 4×4. This illustration also includes an empty betspace, indicating "NO PICK" 530. The Max Win payouts associated with the open betspace appear to be lower 532 in comparison to the Max Win for other individual parlays 534 due to the reduced number of events (3 rather than 4) in that individual parlay. FIG. 22 is an illustration of a three-dimensional parlay cube. Aside from an exponential increase in the quantity of wagering events and individual parlays in a cube parlay, the display, processing functions, and bettor benefits, can be achieved using the same methods discussed herein.

Sportsbook systems, in their current form, are incapable of processing a two-dimensional parlay wager. Key elements of the invention include the ability to pull and convert single-dimension betting information into an interactive two-dimensional display and then, upon completion and confirmation of a two-dimensional parlay wager, convert information on the two-dimensional display into a number of individual parlay wagers for processing and storage by the current sportsbook system.

It will be further understood that various changes in the details, materials, and arrangements of the parts which have been described and illustrated in order to explain the nature of this invention may be made by those skilled in the art without departing from the scope of the invention as expressed in the following claims.

I claim:

1. A non-transitory machine-readable storage medium, having encoded thereon program code, wherein, when the program code is executed by a machine, the machine implements a method for placing a plurality of parlay wagers, the method comprising the steps of:

(a) receiving a request to open a sportsbook application;

(b) receiving a bettor's profile credentials;

(c) validating the bettor's credentials;

(d) determining the bettor's eligibility to place a wager from the bettor's location; and (e) after the bettor's eligibility is determined in step (d), receiving a request from the bettor to place a two-dimensional parlay betting option on different independent events conducted at different times and at different locations, wherein the two-dimensional parlay betting option comprises at least a 2×2 grid of wagerable events, wherein the bettor selects the positions on all of the betting options in the grid.

2. The non-transitory machine-readable storage medium according to claim 1, further comprising, after step (e), the steps of:

(f) receiving a wagering event from the bettor from a list of available events; and (g) placing the wagering event of a betslip associated with the bettor.

3. The non-transitory machine-readable storage medium according to claim 2, further comprising, after step (f), receiving a selection of the grid size of the grid from the bettor.

4. The non-transitory machine-readable storage medium according to claim 3, further comprising, after receiving the selection of the grid size of the grid, receiving a single wager amount from the bettor.

5. The non-transitory machine-readable storage medium according to claim 4, wherein, after receiving the single wager amount, providing a category of wagerable events to be selected by the bettor.

6. The non-transitory machine-readable storage medium according to claim 5, further comprising, after providing the category, receiving wagers from the category from the bettor.

7. The non-transitory machine-readable storage medium according to claim 6, further comprising, after receiving the selection of the wagering event, receiving a selection of a first location on the grid for the selected wagering event.

8. The non-transitory machine-readable storage medium according to claim 7, further comprising, after receiving the selection of the first location, updating the category to remove wagerable events that conflict with the selected wagering event.

9. The non-transitory machine-readable storage medium according to claim 7, further comprising, after receiving the selection of the first location, receiving a request from the bettor to relocate the selected wagering event from the first location on the grid to a second location on the grid.

10. The non-transitory machine-readable storage medium according to claim 7, further comprising, after receiving the selection of the first location, receiving a sufficient number of wagers to fill all locations on the grid, forming a plurality of parlay bets.

11. The non-transitory machine-readable storage medium according to claim 10, further comprising, after forming a plurality of parlay bets, calculating and displaying a payout for each of the plurality of parlay bets.

12. The non-transitory machine-readable storage medium according to claim 11, further comprising, after calculating and displaying the payout, performing step (g).

13. The non-transitory machine-readable storage medium according to claim 12, further comprising, after performing step (g), displaying the live status of each of the wagers.

14. The non-transitory machine-readable storage medium according to claim 13, further comprising, after the live status of each of the wagers converts to a final status, calculating a final payout.

15. A non-transitory machine-readable storage medium, having encoded thereon program code, wherein, when the program code is executed by a machine, the machine implements a method for placing a plurality of parlay wagers, the method comprising the steps of:

(a) receiving a selection of a grid size of a grid from a bettor, wherein the grid comprises an N×N matrix, wherein N is a positive integer greater than 1;

(b) receiving a wagering event from the bettor from a list of available events;

(c) receiving a selection of a first location on the grid for the selected wagering event;

(d) providing the option either to receive additional wagering events and place each of the additional wagering events into one of the remaining grids or to place a "No Pick" placeholder in a selected grid;

(e) forming a plurality of parlay bets based on the additional wagering events; and (f) calculating payouts for each of the plurality of parlay bets.

16. The non-transitory machine-readable storage medium according to claim 15, wherein, after step (d) and before step (e), the bettor can rearrange the locations of wagering events on the grid.

17. The non-transitory machine-readable storage medium according to claim 15, further comprising, after step (f), the step of:

(g) displaying a live status of each wagering event in its respective location on the grid.

18. The non-transitory machine-readable storage medium according to claim 17, further comprising, after step (g), processing each of the parlay bets after each of the wagering events in the respective parlay events are completed.

19. The non-transitory machine-readable storage medium according to claim 15, further comprising, prior to step (a), providing a list of wagering events from which the bettor can select to place a wager.

20. A non-transitory machine-readable storage medium, having encoded thereon program code, wherein, when the program code is executed by a machine, the machine implements a method for placing a plurality of parlay wagers, the method comprising the steps of:

(a) providing a list of wagerable events;

(b) receiving a selection of a grid size from a bettor, wherein the grid size comprises at least a 3×3 matrix;

(c) receiving a plurality of wagers from the list of different wagerable events from the bettor and placing each one of the plurality of wagers into one of the plurality of grids;

(d) receiving a wager amount from the bettor;

(e) determining a number and types of parlay bets based on the grid size and the number and locations of the wagers in the grids;

(f) displaying win calculations for each of the parlay bets, wherein the parlay bets are not adjacent to each other on the matrix; and (g) allocating a percentage of the wager amount to each of the parlay bets.

* * * * *